United States Patent
Des Jardins et al.

(10) Patent No.: US 11,132,705 B1
(45) Date of Patent: Sep. 28, 2021

(54) MANAGING ADVERTISING INVENTORY

(75) Inventors: G. Thomas Des Jardins, Alexandria, VA (US); Paul Miller, Washington, DC (US); Jeffrey Dalton Porter, Flower Mound, TX (US); Bryan Slavin, Rockville, MD (US); Mark Westling, Chevy Chase, MD (US)

(73) Assignee: Verizon Media Inc., New York, NY (US)

( * ) Notice: Subject to any disclaimer, the term of this patent is extended or adjusted under 35 U.S.C. 154(b) by 2848 days.

(21) Appl. No.: 11/088,263

(22) Filed: Mar. 24, 2005

Related U.S. Application Data

(60) Provisional application No. 60/616,637, filed on Oct. 8, 2004.

(51) Int. Cl.
　　*G06Q 30/00*　　(2012.01)
　　*G06Q 30/02*　　(2012.01)
(52) U.S. Cl.
　　CPC ................ *G06Q 30/0244* (2013.01)
(58) Field of Classification Search
　　CPC .................................... G06Q 30/0244
　　USPC ............................. 705/14, 28, 22
　　See application file for complete search history.

(56) References Cited

U.S. PATENT DOCUMENTS

| | | | | |
|---|---|---|---|---|
| 6,061,691 | A * | 5/2000 | Fox | 707/104.1 |
| 6,338,043 | B1 * | 1/2002 | Miller | 705/14 |
| 6,760,916 | B2 * | 7/2004 | Holtz et al. | 725/34 |
| 2003/0046139 | A1 * | 3/2003 | Beman et al. | 705/10 |
| 2003/0101454 | A1 * | 5/2003 | Ozer et al. | 725/42 |
| 2003/0110171 | A1 * | 6/2003 | Ozer et al. | 707/10 |
| 2003/0171990 | A1 * | 9/2003 | Rao et al. | 705/14 |
| 2004/0024641 | A1 | 2/2004 | Cartwright | |
| 2004/0025174 | A1 * | 2/2004 | Cerrato | 725/9 |
| 2004/0225562 | A1 * | 11/2004 | Turner | 705/14 |
| 2005/0038667 | A1 | 2/2005 | Hileman et al. | |
| 2009/0007172 | A1 * | 1/2009 | Ahanger | H04N 7/17336 725/36 |

OTHER PUBLICATIONS

NetGravity Launches AdServer 3.0, Significant Enhancements Focused On Agency Reporting, Open Targeting Architecture, Inventory Forecasting, and Robust System Architecture; Building on Extensive Customer Feedback, New Version of Leading Advertising Management . . . , Business Wire, Mar. 11, 1997 (Year: 1997).*

Non-Final Office Action from U.S. Appl. No. 11/088,262 dated Jun. 19, 2008 (22 pages).

(Continued)

*Primary Examiner* — Matthew L Hamilton
(74) *Attorney, Agent, or Firm* — Bookoff McAndrews, PLLC

(57) ABSTRACT

The amount of dynamic content consumed by an audience at one or more locations in one or more content sites may be determined. This information may then be used by an inventory management system to forecast or estimate the future available advertising inventory at the locations. When the entity receives an insertion order, the entity may use the forecasted advertising inventory to help determine the locations to which the campaign should be allocated and when the advertising campaign should be scheduled so that the requirements of the advertising campaign can be met.

18 Claims, 21 Drawing Sheets

(56) References Cited

OTHER PUBLICATIONS

Office Action for U.S. Appl. No. 11/088,262 mailed Dec. 5, 2008 (43 pages).
U.S. Appl. No. 11/088,262, filed Mar. 24, 2005 (67 pages).
Office Action for U.S. Appl. No. 11/088,262 mailed Jul. 30, 2009 (21 pages).

* cited by examiner

600

| User ID | Time | Message Type | Content | Surface Location | Brand |
|---|---|---|---|---|---|
| 123 | 9:01am | Connect | Station ID | 90's Alternative | AOL |
| 123 | 9:02am | Connect | Shampoo Ad | 90's Alternative | AOL |
| 123 | 9:03am | Connect | Blink 182 | 90's Alternative | AOL |
| 123 | 9:05am | Continue |  | 90's Alternative | AOL |
| 123 | 9:06am | End | Blink 182 | 90's Alternative | AOL |

| 90's Alternative | | |
|---|---|---|
| Date | Time Block | TTSL/V (mins) |
| 2/2/05 | 9:00am-10:00 am | 100 |
| 2/2/05 | 10:00am-11:00 am | 75 |
| 2/2/05 | 11:00am-12:00pm | 62 |

FIG. 7

| Audience (listener hours) | 2/1 | 2/2 | 2/3 | 2/4 | 2/5 | 2/6 | 2/7 | Total |
|---|---|---|---|---|---|---|---|---|
| 90's Alternative | 400 | 1,000 | 1,000 | 1,000 | 1,000 | 1,000 | 600 | 6,000 |
| 80's Alternative | 200 | 500 | 500 | 500 | 500 | 500 | 200 | 2,900 |
| Total | 600 | 1,500 | 1,500 | 1,500 | 1,500 | 1,500 | 800 | 8,900 |

| Capacity (impressions) | 2/1 | 2/2 | 2/3 | 2/4 | 2/5 | 2/6 | 2/7 | Total |
|---|---|---|---|---|---|---|---|---|
| 90's Alternative (3 imp./hour) | 1,200 | 3,000 | 3,000 | 3,000 | 3,000 | 3,000 | 1,800 | 18,000 |
| 80's Alternative (2 imp./hour) | 400 | 1000 | 1000 | 1000 | 1000 | 1000 | 400 | 5,800 |
| Total Available Impressions | 1,600 | 4,000 | 4,000 | 4,000 | 4,000 | 4,000 | 2,200 | 23,800 |

| Alternative Rock – 9am-10am | | | |
|---|---|---|---|
| | Day 1 | Day 2 | Day 3 |
| Available Inventory (impressions) | 1000 | 2000 | 3000 |
| Order 1 | 333 | 667 | 1000 |
| Order 2 | 333 | 667 | |
| Order 1: 5000 ads over 3 days<br>Order 2: 2000 ads over 2 days | | | |

1304

| Alternative Rock – 10am-11am | | | |
|---|---|---|---|
| | Day 1 | Day 2 | Day 3 |
| Available Inventory (impressions) | 2000 | 1000 | 1000 |
| Order 1 | 667 | 333 | 333 |
| Order 2 | 667 | 333 | |
| Order 1: 5000 ads over 3 days<br>Order 2: 2000 ads over 2 days | | | |

1306

| Classic Rock – 9am-10am | | | |
|---|---|---|---|
| | Day 1 | Day 2 | Day 3 |
| Available Inventory (ads/impressions) | 2000 | 1000 | 2000 |
| Order 1 | 667 | 333 | 667 |
| Order 1: 5000 ads over 3 days<br>Order 2: 2000 ads over 2 days | | | |

FIG. 13

MANAGING ADVERTISING INVENTORY

CLAIM OF PRIORITY

This application claims priority under 35 USC §119(e) to U.S. Provisional Patent Application Ser. No. 60/616,637, filed on Oct. 8, 2004, the entire contents of which are hereby incorporated by reference.

TECHNICAL FIELD

This description relates to managing advertising inventory.

BACKGROUND

Dynamic content may be delivered and presented to users across packet-based networks, such as the Internet. Dynamic content generally refers to content that continuously or nearly continuously changes over time (that is, content with a temporal dimension), such as audio and/or visual content. When sent over a packet-based network, such dynamic content may be, for example, downloaded content that is fully transmitted to a client system before the client system presents the content. Alternatively, such dynamic content may be, for example, streaming content such as streaming audio and/or video. Streaming content generally refers to content that is sent as a continuous stream and presented as it is received at a client system. Thus, a user of a client system that is receiving streaming content does not wait until the content is fully downloaded before the dynamic content is presented, as is generally the case for downloaded content. Rather, the client system receiving streaming content usually downloads and buffers a portion of the dynamic content. The client system then presents the buffered portion another portion of the dynamic content is downloading.

Streaming content may be sent from a pre-encoded (or otherwise pre-prepared) file (referred to as "on-demand" streaming) or may be distributed as part of a live broadcast feed (referred to as "live" streaming). For live streaming, a live broadcast feed is typically encoded into a compressed digital signal as the broadcast feed is received, for example, by an encoder and the encoded signal is transmitted from a server that is able to do multicast; that is, able to send the same signal to multiple client systems at the same time. A live broadcast feed may depict live activity (that is, activity occurring as the feed is broadcasted) or may depict previously recorded activity.

Different segments or pieces of dynamic content may be coupled together to form a collection of dynamic content. In addition, different types of dynamic content may be coupled together to form a collection of different types of dynamic content. The different types of dynamic content may include, for example, programming content and advertising content. Programming content is generally the editorial content that a user desires to have presented. Advertising content is generally any other content besides the editorial content and is typically content that promotes particular services or goods. Advertising content may be, for example, previews for programming content being offered in the future (referred to as "previews"), an indication of the source of programming content (referred to as "branding"), or promotions to buy or otherwise acquire specific products or services (referred to as "advertisements").

SUMMARY

In a disclosed implementation, an inventory management system may be used to assist an entity in allocating future advertising campaigns against future advertising inventory for dynamic advertising content, such as audio or video advertising. The inventory management system may forecast or estimate the future available advertising inventory at the locations. When the entity receives an insertion order, the entity may use the forecasted advertising inventory to help determine where and when the advertising campaign should be scheduled so that the requirements of the advertising campaign can be met. The portion of the advertising inventory consumed by the advertising campaign at the locations may be calculated and subtracted from the available inventory to represent the estimated available inventory left at the locations. Such information may be used by the entity to help determine whether more advertising inventory is available for sale or to determine whether the requirements of a new insertion order can be met.

According, to one general aspect, data is accessed that indicates a cumulative amount of time that dynamic programming content was presented to members of an audience during a past time period. The dynamic programming content is or has been associated with one or more locations in one or more computer-based content sites. The advertising inventory that will be available at the one or more locations during a future time period is estimated based on this accessed data. An advertising campaign is associated with the one or more locations during the future time period The amount of estimated available inventory that is consumed by the advertising campaign during the future time period is estimated and used to estimate a remaining advertising inventory that will be available at the one or more locations during the future time period.

Implementations may include one or more of the following features. For example, the available advertising inventory may be estimated based on the accessed data and the one or more spot loads for the future time period. An interface may be presented that shows the estimated remaining inventory for the one or more locations during the future time period.

The locations may be associated with a category and associating the advertising campaign with the locations may include associating the advertising campaign with the category. The advertising campaign may define a target group and the advertising campaign the category may be selected based on the target group defined by the advertising campaign. A hierarchy of categories may be maintained, with the categories of lower level nodes of the hierarchy sub-dividing the categories of one or more higher level nodes. The advertising campaign may be associated with a category by associating the advertising campaign with a node of the hierarchy.

Estimating the amount of consumed advertising inventory may include simulating a scheduler that selects advertising content associated with the advertising campaign for presentation when the dynamic content associated with the one or more locations is presented. Alternatively, or additionally, estimating the amount of consumed advertising inventory may include allocating to the one or more locations, collectively, a portion of the total amount of advertising inventory to be consumed by the advertising campaign. The portion may be proportional to the estimated available advertising inventory.

According to another general aspect, a hierarchy is maintained, with nodes of the hierarchy corresponding to themes. Each of the nodes has associated with it dynamic programming content that is related to a corresponding theme of the node. The associated dynamic programming content is available for selection by a member of an audience and selected dynamic programming content then is presented to the member by a media client application. In addition, an advertising campaign is associated with at least some of the nodes and a future time period. As a result, a piece of advertising content associated with the advertising campaign is presented to members of the audience when selected dynamic content that is associated with a node associated with the advertising campaign is presented.

The amount of advertising inventory that will be available during the future time period is estimated for each of the nodes associated with the advertising campaign. The available inventory is estimated based on data indicating, for each node associated with the advertising campaign, a cumulative amount of time that dynamic programming content associated with the node was presented to members of the audience during a past time period. The amount of advertising inventory that will be consumed by the advertising campaign during the future time period also is estimated for each of the nodes associated with the advertising campaign. The remaining advertising inventory during the future time period at each of the nodes associated with the advertising campaign is estimated by subtracting the estimated amount of advertising inventory that will be consumed by the advertising campaign from the estimated amount of advertising inventory that will be available during the future time period.

Implementations of this aspect may include one or more of the following features. For example, the advertising campaign may specify a target group and the advertising campaign may be associated with nodes that have themes of interest to the target group. Estimating an amount of advertising inventory that will be consumed may include simulating a scheduler that selects the piece of advertising content associated with the advertising campaign for presentation when at least some of the dynamic content associated with the nodes associated with the advertising campaign is presented. Alternatively, or additionally, estimating the amount of consumed advertising inventory may include allocating, to each node associated with the advertising campaign, portions of the total amount of advertising inventory to be consumed by the advertising campaign. Each portion may be proportionally allocated to a node based on the estimated amount of advertising inventory that will be available at the node during the future time period.

Implementations of the described techniques may include hardware, a method or process, and computer software on a computer-accessible medium.

The details of one or more implementations are set forth in the accompanying drawings and the description below. Other features will be apparent from the description and drawings, and from the claims.

DESCRIPTION OF DRAWINGS

FIG. 6 shows an example of a table that may be created by the audience measurement server of FIG. 1 to track information about dynamic content consumed by a member of an audience.

FIG. 7 shows an example of a table that may be created by the audience measurement server of FIG. 1 to indicate the cumulative amount of time dynamic content from a particular surface location was presented to members of an audience on an hourly basis for a given day.

FIGS. 8A-13 show examples of processes that may be performed by the inventory manager of FIG. 1 and examples of the outcomes of those processes.

DETAILED DESCRIPTION

Figure 1:
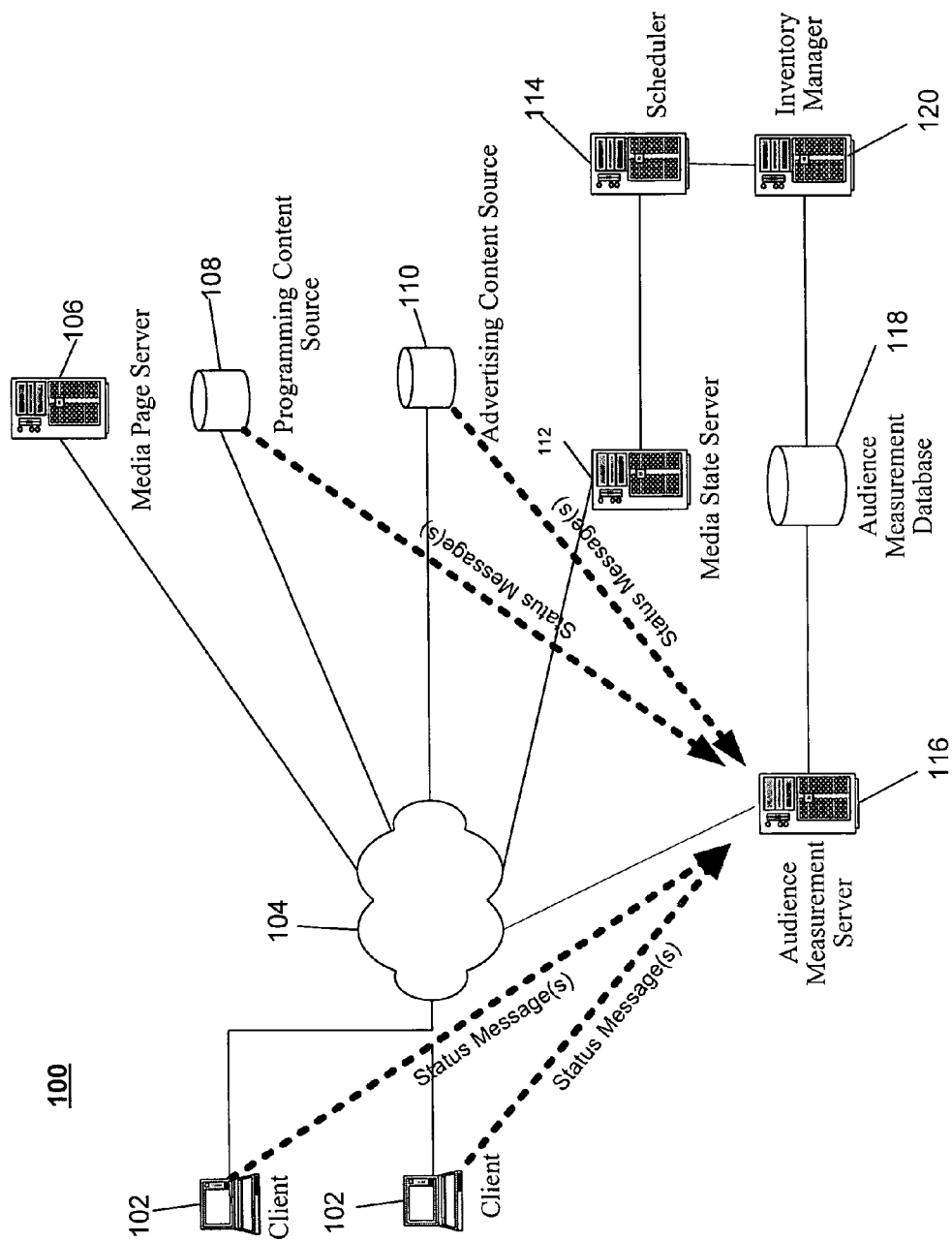
FIG. 1 is a block diagram of a system that presents programming content and advertising content on a client system.

According to various implementations, an entity may make dynamic programming content available to members of an audience on one or more site locations in one or more content sites. The audience may be the set of users that access the content or some subset of those users. For example, the audience may be all users that access the content, may be the users in a particular geography that access the content, may be the users that access the content during a particular time, may be the users that access the content using particular technology that allows the user's consumption of content to be tracked, or may be the users that meet any combination of such factors.

Consumption of the dynamic programming content by members of the audience creates opportunities to present advertising content to the members of the audience. Advertising inventory refers to some quantity of such opportunities to present advertising content to the members over a time period. In several implementations, the amount of advertising inventory available during a time period may be calculated as the product of two items: (1) the spot load during the time period (that is, the ratio of advertising content presented to a member of an audience during the time period to dynamic content presented to the member during the time period) and (2) the cumulative amount of time that members of the audience spend viewing or listening to dynamic content during the time period. For example, if the spot load during a time period is three pieces of advertising content per hour of dynamic content presented and the cumulative amount of time members of the audience spend viewing or listening to dynamic content during that time period is 1000 hours, then the available advertising inventory for the time period is 3000 pieces of advertising content.

Accordingly, as members of an audience consume programming content available at one or more locations in one or more content sites, advertising inventory is created at those locations. Generally, the entity may "sell" future advertising inventory by accepting orders for new advertising campaigns (an order for a new advertising campaign may be referred to as an "insertion order"). An insertion order may describe the parameters of the advertising campaign, such as, for example, a particular piece of advertising content (for example, a particular advertisement) to be presented (sometimes referred to as the "creative"), may describe a certain target group to which the creative should be presented, and may quantify in one way or another a certain number of times the creative should be presented within a certain time period. To meet such requirements, the entity may associate the advertising campaign with one or more of the locations in an attempt to present the particular piece of advertising content the requested number of times to the target group.

However, because the entity is selling future advertising inventory, and future advertising inventory depends on how much dynamic content will be consumed by members of the audience in the future, the actual amount of future available advertising inventory is not generally known when the entity accepts the new advertising campaign. Thus, it may be difficult to sell the right amount of advertising inventory. For instance, the entity may sell more advertising inventory than what is available in the future, in which case the amount of advertising content presented is less than the amount the advertiser desired to have presented. Alternatively, the entity may sell less inventory than what is available in the future, in which case the entity is losing advertising revenue.

To assist the entity in selling the right amount of inventory, the amount of dynamic content consumed by the audience at one or more of the locations may be determined. This information may then be used by an inventory management system to forecast or estimate the future available advertising inventory. When the entity receives an insertion order, the entity may use the forecasted advertising inventory to help determine the locations to which the campaign should be allocated and when the advertising campaign should be scheduled so that the requirements of the advertising campaign can be met. The portion of the advertising inventory consumed by an advertising campaign at the locations may be calculated and subtracted from the available inventory at the locations to represent the estimated available inventory left at the locations. Such information may be used by the entity to help determine whether more advertising inventory is available for sale or to determine whether the requirements of a new insertion order can be met.

In some implementations, the entity may associate one or more of the locations with one or more categories and may forecast the future available advertising inventory for the categories. For example, the entity may manage programming content in a hierarchical fashion. Each node of the hierarchy may represent a particular theme or topic, and programming content related by that theme or topic may be associated with the node. Then, the programming content associated with a node may be made available on one or more locations in one or more content sites. As members of an audience consume programming content associated with the node from the one or more locations, the amount of dynamic content consumed by the audience may be determined. This then may be used to estimate or forecast the future available inventory at the node.

In this case, the entity may allocate advertising campaigns against one or more nodes. When an advertising campaign is associated with a node, the creative associated with the campaign is then available to be presented when programming content associated with the node is presented. The entity may use the forecasted advertising inventory at the nodes to help determine one or more nodes to which an advertising campaign should be allocated and when the advertising campaign should be scheduled so that the requirements of the advertising campaign can be met. For instance, the entity may select nodes with themes or topics that are expected to be attractive to the target group, and then use the estimated value of the available inventory to determine whether the piece of advertising content can be presented the requested number of times at those nodes. The portion of the advertising inventory consumed by an advertising campaign at the nodes then may be calculated and subtracted from the available inventory at the nodes to represent the estimated available inventory left at the nodes.

Referring to FIG. 1, a system 100 presents programming content and advertising content on client systems 102, and facilitates the management of future advertising inventory. System 100 includes one or more client systems 102 that can communicate with a server computer 106 over a packet-switched network 104, such as the Internet. System 100 also includes a media state server 112, a scheduler 114, an audience measurement server 116, an audience measurement database 118, an inventory manager 120, and a programming content source 108 and an advertising content source 110.

Each of the components of system 100 (for example, client systems 102, media page server 106, media state server 112, scheduler 114, audience measurement server 116, audience measurement database 118, inventory manager 120, programming content source 108 and advertising content source 110) may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. These components may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal.

Packet switched network 104 may include the Internet, Wide Area Networks (WANs), Local Area Networks (LANs), analog or digital wired and wireless telephone networks (for example, a Public Switched Telephone Network (PSTN), an Integrated Services Digital Network (ISDN), or a Digital Subscriber Line (xDSL)), or any other wired or wireless network including, for example, a corporate LAN. Network 104 may include multiple networks or subnetworks, each of which may include, for example, a wired or wireless data pathway.

In addition, while illustrated as separate components, combinations of client systems 102, media page server 106, media state server 112, scheduler 114, audience measurement server 116, audience measurement database 118, inventory manager 120, programming content source 108 and/or advertising content source 110 may be implemented on a single computing device or cluster of computing devices.

In general, client systems 102 communicate with media page server 106 to obtain a media page, from which a user can select programming content for presentation by client systems 102. The client systems 102 receive the selected programming content from programming content source 108 and present it to the user. Client systems 102 also may present advertising content from advertising content source 110.

Client systems 102 may communicate with media state server 112 to determine specific advertising content to present from advertising content source 110. As described more fully in application Ser. No. 11/023,638, filed Dec. 29, 2004 and entitled "Advertising Content Delivery," incorporated herein by reference, media state server 112 may access a template to determine parameters of the advertising content to be presented on client systems 102. Such parameters may include, for example, how many pieces of advertising content should be presented and the types of advertising content (for example, previews, advertisements, or teasers).

Media state server 112 then communicates these parameters to scheduler 114. Based on these parameters and the requirements of various advertising campaigns, scheduler 114 then selects one or more specific pieces of advertising content. Scheduler 114 then identifies the specific piece(s) of advertising content to media state server 112. Media state server 112 then causes client system 102 to present the specific piece(s) of advertising content.

As client systems 102 present dynamic content, they may send status messages to audience measurement server 116. The status messages may indicate information such as the node in a hierarchy from which programming content was selected and the amount of time dynamic content was presented as a result of the selection. Based on such information, audience measurement server 116 may calculate the cumulative amount of time content from a node was presented to client systems 102 during a time period. Audience measurement server 116 then may store this information in audience measurement database 118.

Alternatively, or additionally, programming content source 108, advertising content source 110, or both, may send status messages to audience measurement server 116. The status messages may indicate information such as the node in a hierarchy from which programming content was selected and the number of users receiving content at that point in time. Based on such information, audience measurement server 116 may calculate the cumulative amount of time content from a node was presented to client systems 102 during a time period. Audience measurement server 116 then may store this information in audience measurement database 118.

The information in audience measurement database 118 may be accessed by inventory manager 120 and used to forecast future available advertising inventory. Inventory manager 120 also may communicate with scheduler 114 to update the estimated future inventory based on accepted insertion orders (for example, by subtracting the advertising inventory consumed by accepted insertion orders from the estimated inventory).

Figure 5:
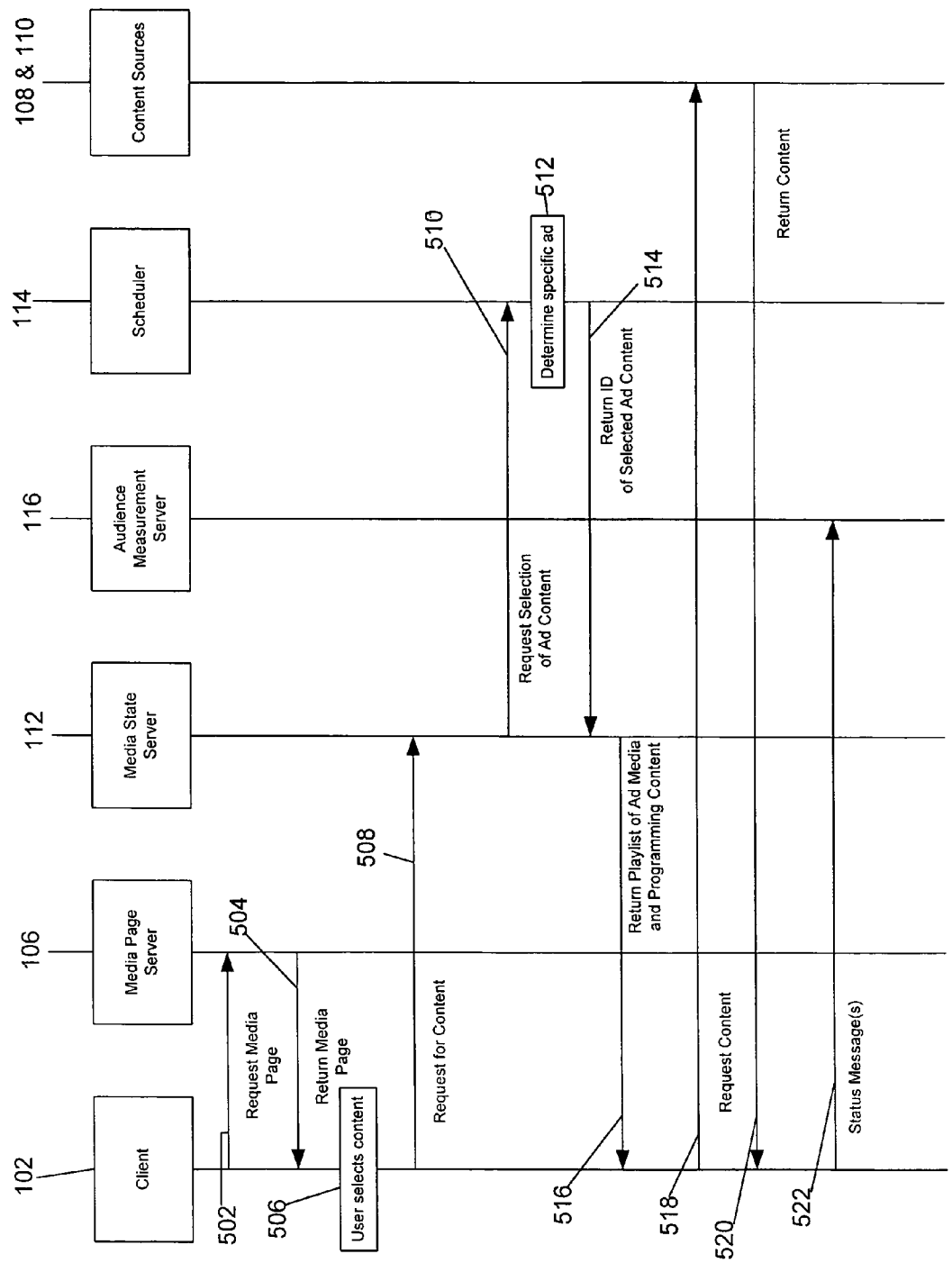
FIG. 5 illustrates communications of various components of the system shown in FIG. 1 for one implementation.

An implementation of the interactions of client systems 102, media page server 106, media state server 112, audience measurement server 116, scheduler 114, and content sources 108 and 110 are more fully described in FIGS. 5-7 and an implementation of the operation of audience measurement server 116 and inventory manager 120 is more fully described with respect to FIGS. 6-13.

Client system 102 may execute a hypertext transfer protocol (HTTP) based web browser that presents media pages: such as hypertext markup language (HTML) or other markup language web pages. A media client application may be embedded in one or more of the web pages presented by the web browser. The media client application presents dynamic content, such as audio content or video content, to a user through, for example, visual, auditory, or tactile presentation devices. The media client application also may implement the HTTP protocol to request the dynamic content.

Alternatively, the media client application may be a stand-alone application that presents both static content, such as the static portion of web pages, and the dynamic content such as audio or video content. Stand-alone media client applications also may implement HTTP to request the static content and/or the dynamic content. Examples of a media client application include Windows Media Player from Microsoft Corp. of Redmond, Wash. and RealPlayer from RealNetworks of Seattle, Wash., both of which can be stand-alone or embedded into a web page.

Programming content source 108 may execute HTTP server software to respond to requests for programming media from an HTTP-based media client application. In response to such requests, programming media source 108 provides the requested programming media to the media client application for presentation. Similarly, advertising content source 110 may execute HTTP server software to respond to requests for advertising media.

Likewise, server computer 106 may execute HTTP server software to respond to data requests from an HTTP-based web browser and/or an HTTP-based media client application executing at client system 102. In response to a data request from the web browser or media client application, server computer 106 provides a media page, for example a web page, for presentation by the web browser or media client application.

The web page may present one or more selections of programming content for presentation by the media client application and includes information (for example, a uniform resource locator (a URL)) that allows the media client application to form a request for the programming content. The programming content may be in the form of live or on-demand media streams, or in the form of downloaded content.

Figure 2:
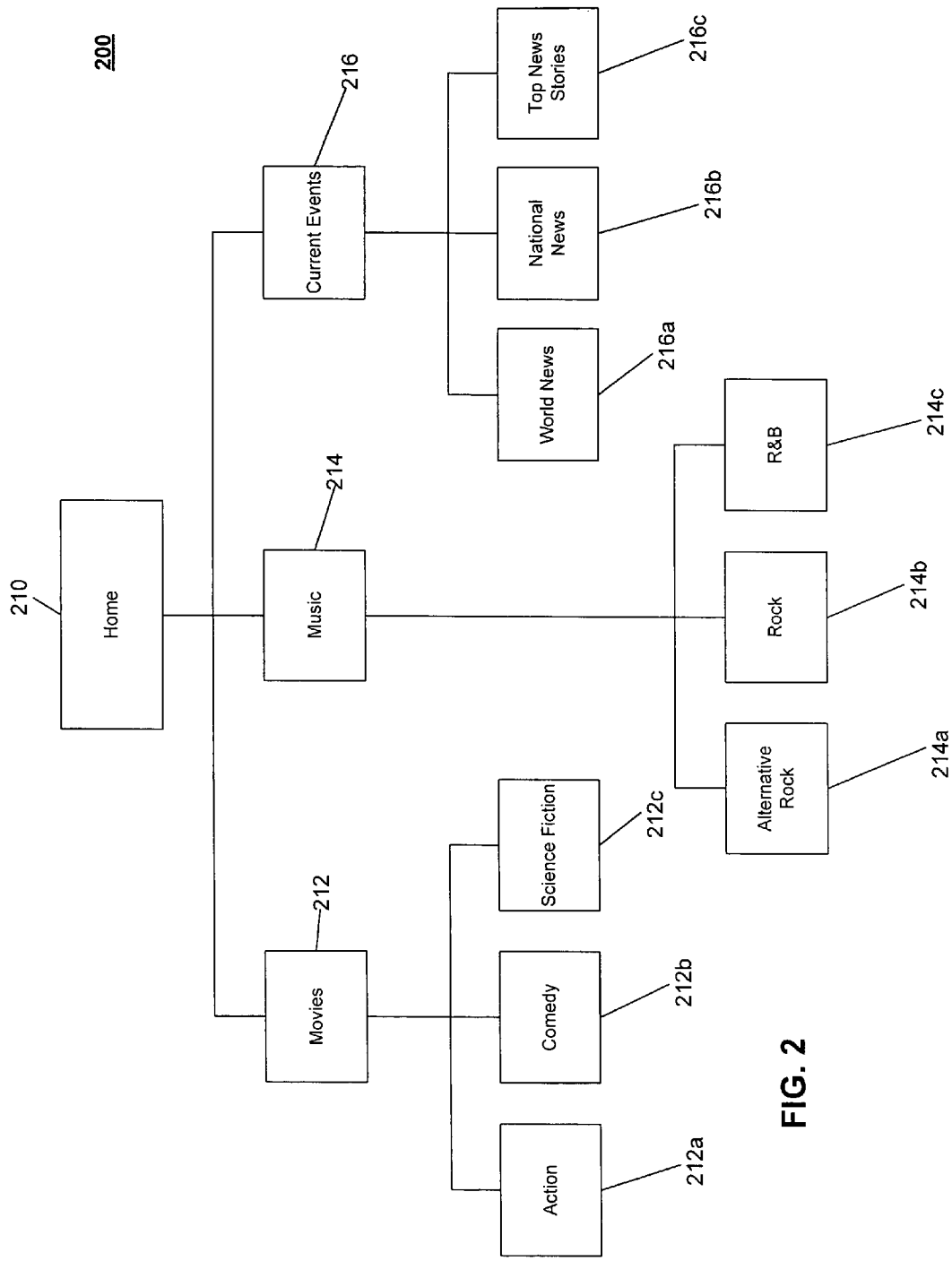
FIG. 2 shows an example of a management hierarchy.

Referring to FIG. 2, the web page may be owned or operated by an entity that manages programming content and advertising in a hierarchical fashion. A management hierarchy 200 may include various nodes, where each node corresponds to a particular topic or theme. Lower level nodes of the hierarchy may further subdivide the topic or theme of upper level nodes. For example, management hierarchy 200 includes a "music" node 214, with a "alternative rock" node 214a, a "rock" node 214b, and a "R&B" node 214c underneath the "music" node 214.

More specifically, at the top of management hierarchy 200 is a home node 210 that represents the collection of all programming content managed under this hierarchy. Underneath home node 210 are nodes directed to different topics or themes. For example, under home node 210 is a node 212 directed to movies, a node 214 directed to music, and a node 216 directed to current events. Each of these nodes has nodes underneath them directed to sub-topics or sub-themes of the topic or the theme associated with the higher level node. For instance, the movies node 212 has a lower level node 212a directed to action movies, a lower level node 212b directed to comedies, and a lower level node 212c directed to science fiction movies. The music node 214 includes a lower level node 214a directed to alternative music, a lower level node 214b directed to rock music, and a lower level node 214c directed to R&B music. Likewise, the current events node 216 includes a lower level node 216a directed to world news, a lower level node 216b directed to national news, and a lower level node 216c directed to top news stories.

The entity may associate one or more pieces of programming content with a node in the management hierarchy, where the pieces of programming content are related by the topic or theme of that node. For example, music videos by alternative rock bands may be associated with "alternative rock" node 214a. In general, the programming content that is associated with a node may or may not be related by any parameter other than the theme of the node.

Programming content that is associated with a lower level node may then be associated with the nodes above the lower level node. For instance, programming content related to action movies may be associated with action node 212a, programming content related to comedy movies may be associated with comedy node 212b, and programming content related to science fiction movies may be associated with 212c. The aggregate of the programming content associated with nodes 212a, 212b, and 212c may then be associated with movies node 212. Similarly, the aggregate of the content associated with nodes 212, 214, and 216 is associated with home node 210.

In addition, some programming content that is associated with one node may be associated with another one of the nodes. For example, programming content associated with the "alternative rock" node 214a may be associated also with the "top news stories" node 216c. For instance, if an alternative rock band has a new music video, that music video may be associated with the "alternative rock" node 214a and may also (at least while the music video is still considered new) be associated with the "top news stories" node 216c.

Other hierarchical organizations are possible. For example, a news station may have a hierarchy that breaks down into news related topics, such as headline news, local news, world news, sports, talk shows, etc. Furthermore, a hierarchy may be maintained for a number of media outlets and may have a hierarchical organization that breaks down into the various media outlets, and then further breaks down into various topics offered by those media outlets. In addition, a provider of online content may have its own "channels" of specialized content, and these channels may be included in the hierarchy. For instance, the online service from America Online, Inc. of Dulles, Va. offers a "channel" to subscribers referred to as "AOL Sessions," which provides unique performances by various artists.

One or more of the nodes of management hierarchy 200 may be surface locations (also referred to as a site location). A surface location is a node on management hierarchy 200 that has some or all of its associated programming content made available to a user as a collection of programming content that is associated with the topic or theme of the surface location. Thus, programming content associated with a surface location is "surfaced" to the user as programming content that relates to the theme of the surface location. For example, if the "alternative rock" node is a surface location, then some or all of the programming content associated with the "alternative rock" node 214a is made available to a user as a collection of programming content related to alternative rock.

The programming content associated with a surface location may be made available to members of an audience at one or more locations on one or more content sites. In general, the presentation of the programming content from these locations creates some advertising inventory for those locations. The entity may manage this advertising inventory according to the management hierarchy by allocating an advertising campaign among various nodes of the management hierarchy. Allocating a campaign to a node may associate the campaign with any surface locations at or below that node. As a result, the creative of the campaign may be presented during the opportunities that occur when programming content associated with surface locations at or below the node is selected for presentation from the one or more locations in the one or more content sites. In general, the entity may allocate a campaign to management nodes in an attempt o reach the target group because the target group is believed to be interested in the theme or topic of the nodes.

In addition, collections of nodes or surface locations may be managed by the entity under a single brand (for example, a product, service, or concept that is publicly distinguished from others by a symbol, brand name, or trademark). The entity may manage the brand with distinct business rules separate from other brands, but particular programming content may be associated with multiple brands. For example, there may be a surface location that has a theme corresponding to audio recordings of live musical performances (that is, the site location makes available audio recordings of live musical performances) and another site location may have a theme corresponding to video recordings (with or without accompanying audio) of live musical performances. These site locations may be on separate branches of the management hierarchy, but from a business perspective are managed under a single brand corresponding to live musical performances.

A number of different interfaces may be used to make some or all of the programming content associated with a surface location available as a collection of content related to the theme or topic of the surface location. For example, the interface may be multiple web pages, as shown and described below in FIGS. 3A-3C. Each web page may correspond to a surface location and be based on the theme or topic of that surface location. Each web page may make some or all of the programming content associated with the surface location available to the user. As another example, a web page or an application interface may present a graphical hierarchy of themes, where the graphical representation allows the user to navigate to a theme that corresponds to a surface location and access programming content associated with that surface location, as shown and described with respect to FIGS. 4A and 4B.

Figure 3A:
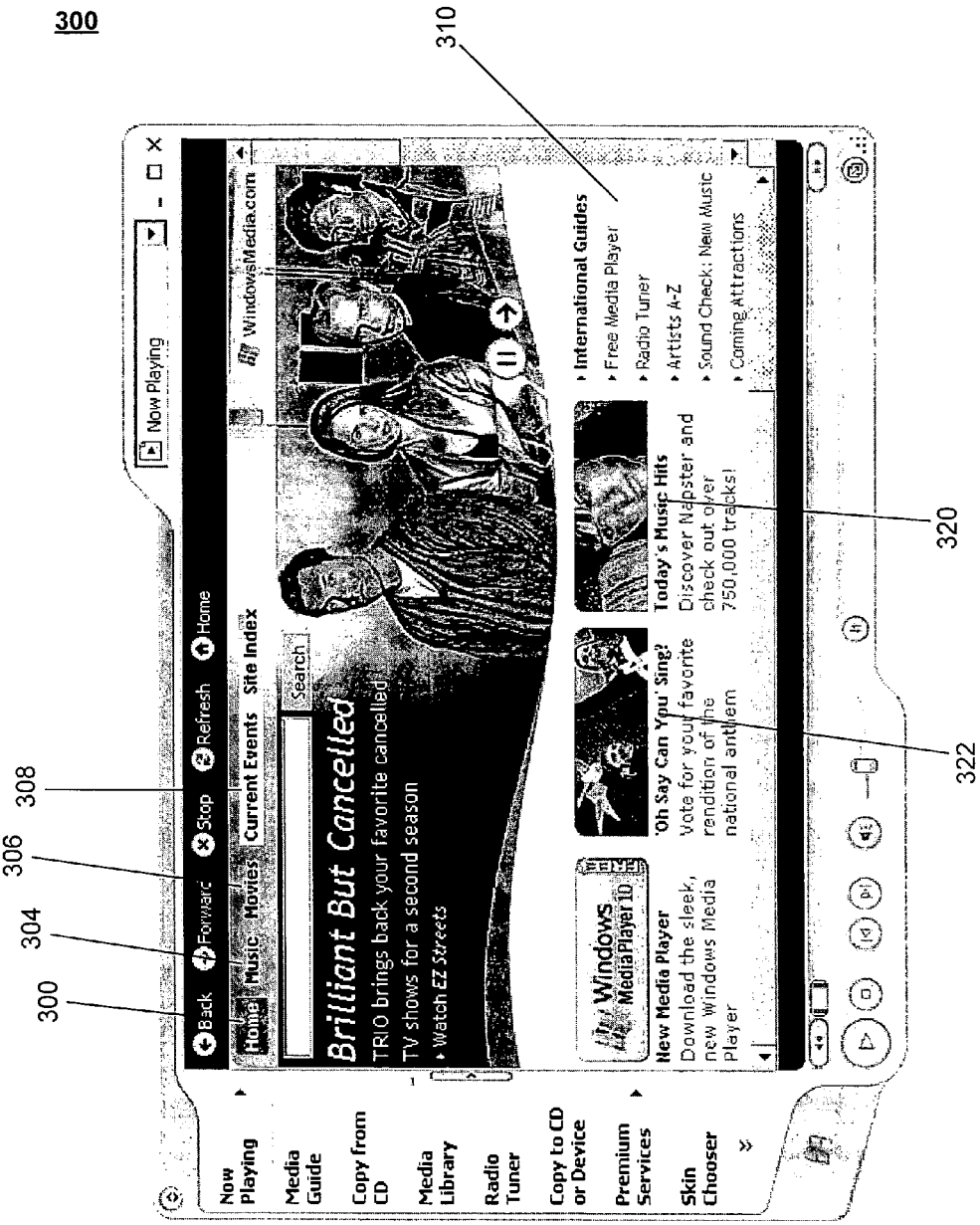
FIGS. 3A-3C show an example of a stand-alone media client application displaying media pages that correspond to surface locations in the management hierarchy of FIG. 2.
Figure 3B:
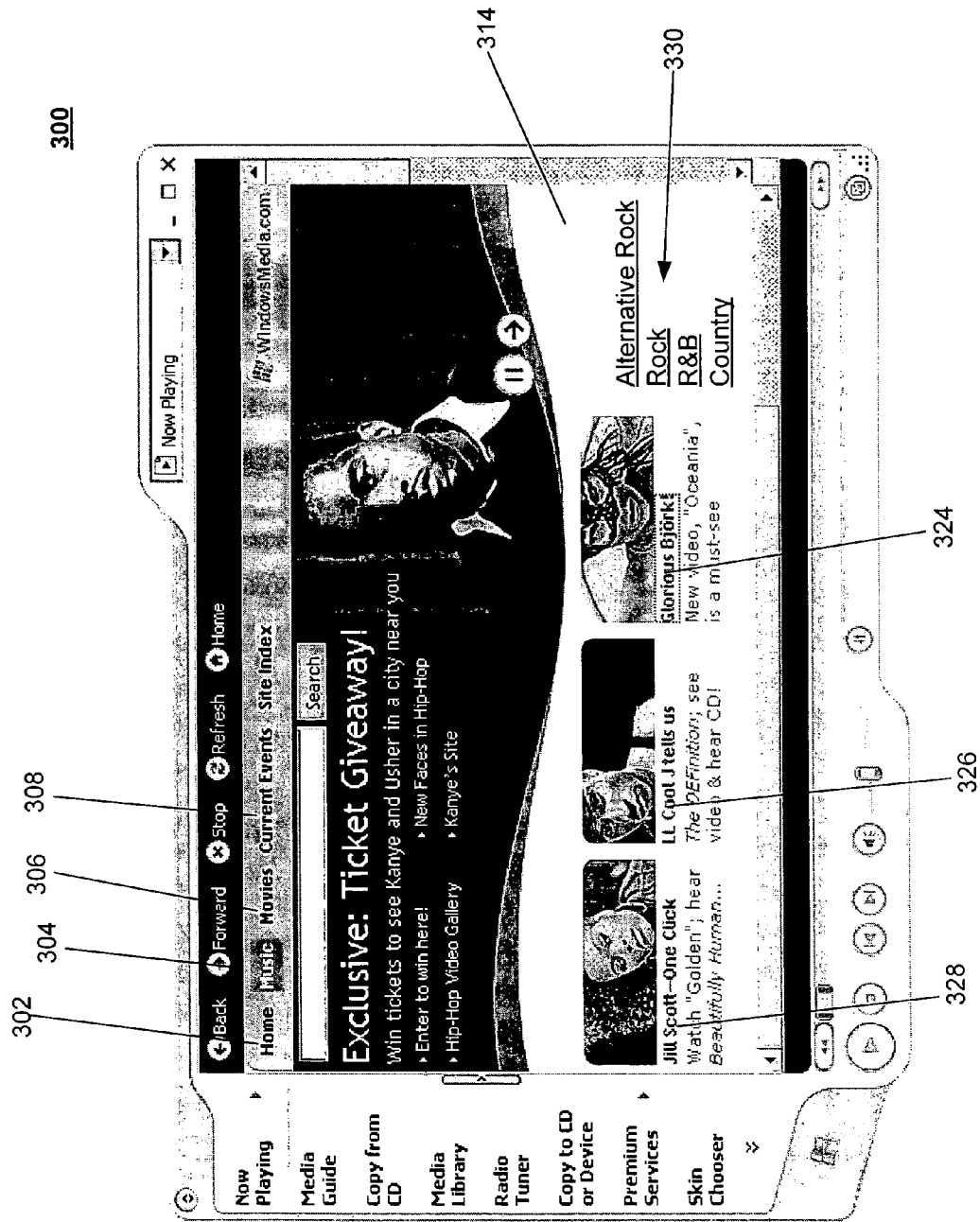
Figure 3C:
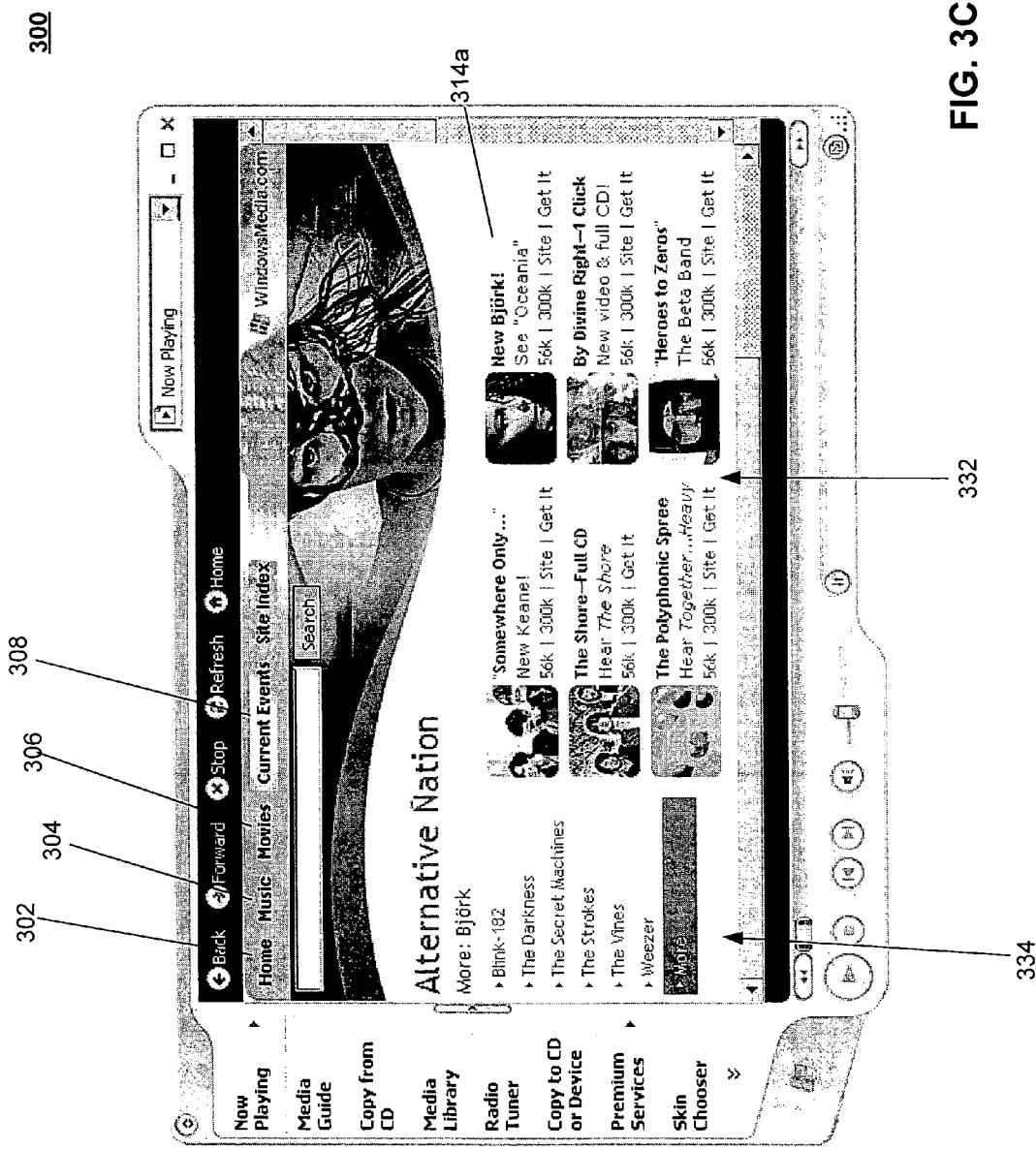

FIGS. 3A-3C show an example of a stand-alone media client application 300 displaying media pages, such as web pages, where each web page corresponds to a node on management hierarchy 200 and each node of the management hierarchy 200 is a surface location. Thus, each web page is based on the theme of the corresponding node of management hierarchy 200, and makes some or all of the programming content associated with the node available to the user.

Referring to FIG. 3A, media client application 300 presents a home web page 310 that includes links 302-308 that correspond to nodes underneath the home node 210 and which link to a corresponding web page. Link 304 links to music web page 314 (shown in FIG. 3B below), link 306 links to a movies web page, and link 308 links to a current events web page. When a user selects one of the links 302-308, the web page corresponding to the lower level interface node is presented by media client application 300. Home web page 310 also includes links 320 and 322 that link to web pages that correspond to lower levels of management hierarchy 200. Link 320 points to a web page for "today's music hits" located, hierarchically, underneath the music web page (the corresponding management node is not shown in FIG. 2). Link 322 points to a web page located, hierarchically, underneath current events web page (the corresponding management node is not shown in FIG. 2).

While not shown, home web page 310 may contain some selections for audio and/or video content associated with home node 210.

Referring to FIG. 3B, when a user selects music link 304 in home web page 310, a music web page 314 is displayed. Music web page 314 includes links 324-328 that provide selections for audio and/or video content associated with music node 212. When a user selects one of links 324-328, the corresponding audio and/or video is presented to the user by media client application 300. Music web page 314 also includes links 330 that link to web pages under the music interface node.

Referring to FIG. 3C, when a user selects the "Alternative Rock" link from links 330, an alternative rock music web page 314a is displayed. Alternative rock music web page 314a contains selections 332 of audio and/or video content associated with alternative rock node 214a. Similar to links 324-328, when a user selects one of links 332, the corresponding audio and/or video is presented to the user by media client application 300. Alternative rock music web page 314a also includes links 334 to interface nodes underneath the alternative rock web page (the corresponding management nodes are not shown in FIG. 2). The lower level interface nodes have themes/topics that correspond to particular bands whose music fits within the topic/theme "alternative rock music" (links to interface nodes for the bands Blink-182, The Darkness, The Secret Machines, The Strokes, The Vines, and Weezer are shown).

Thus, by navigating through the various web pages, the user may navigate to a site location having a theme the user is interested in, and select particular programming content associated with the site location/theme using links on the web page to which the user has navigated.

Figure 3D:
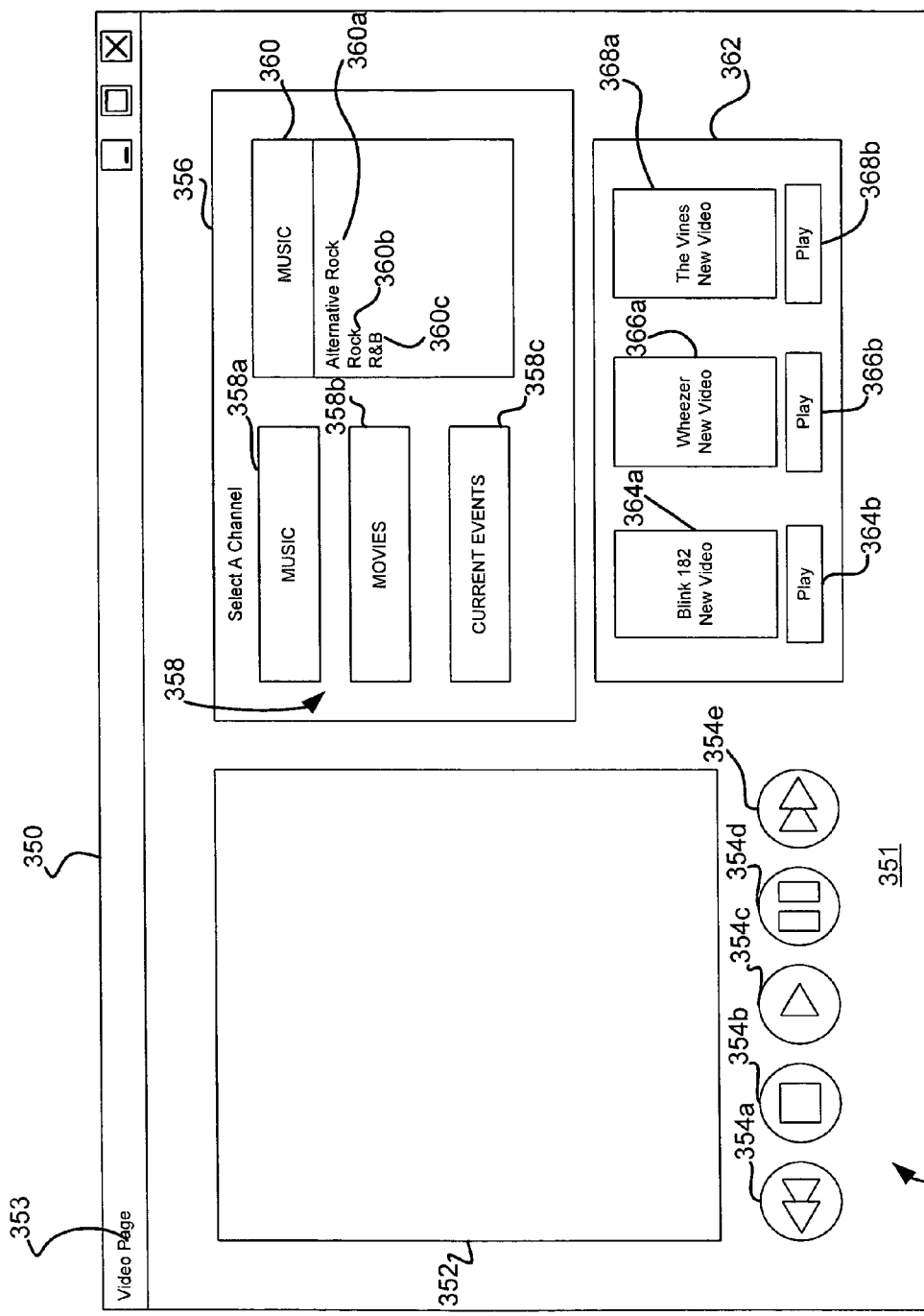
FIG. 3D shows an example of an interface that allows a user to navigate to one of the surface locations in the management hierarchy of FIG. 2.
Figure 4A:
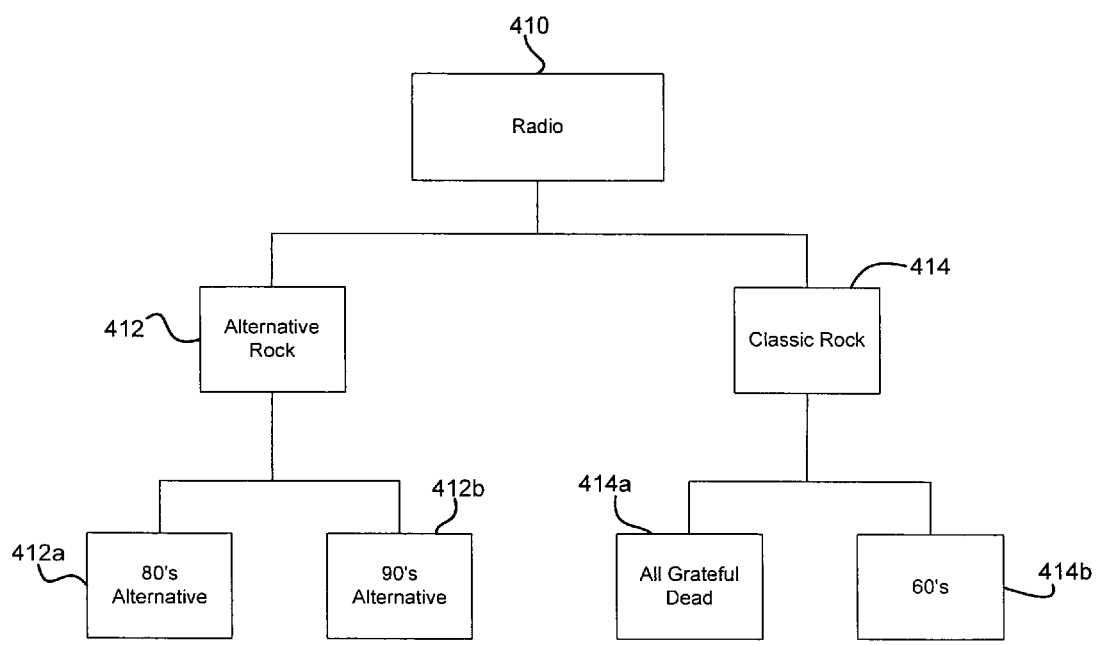
FIG. 4A shows an example of another management hierarchy.
Figure 4B:
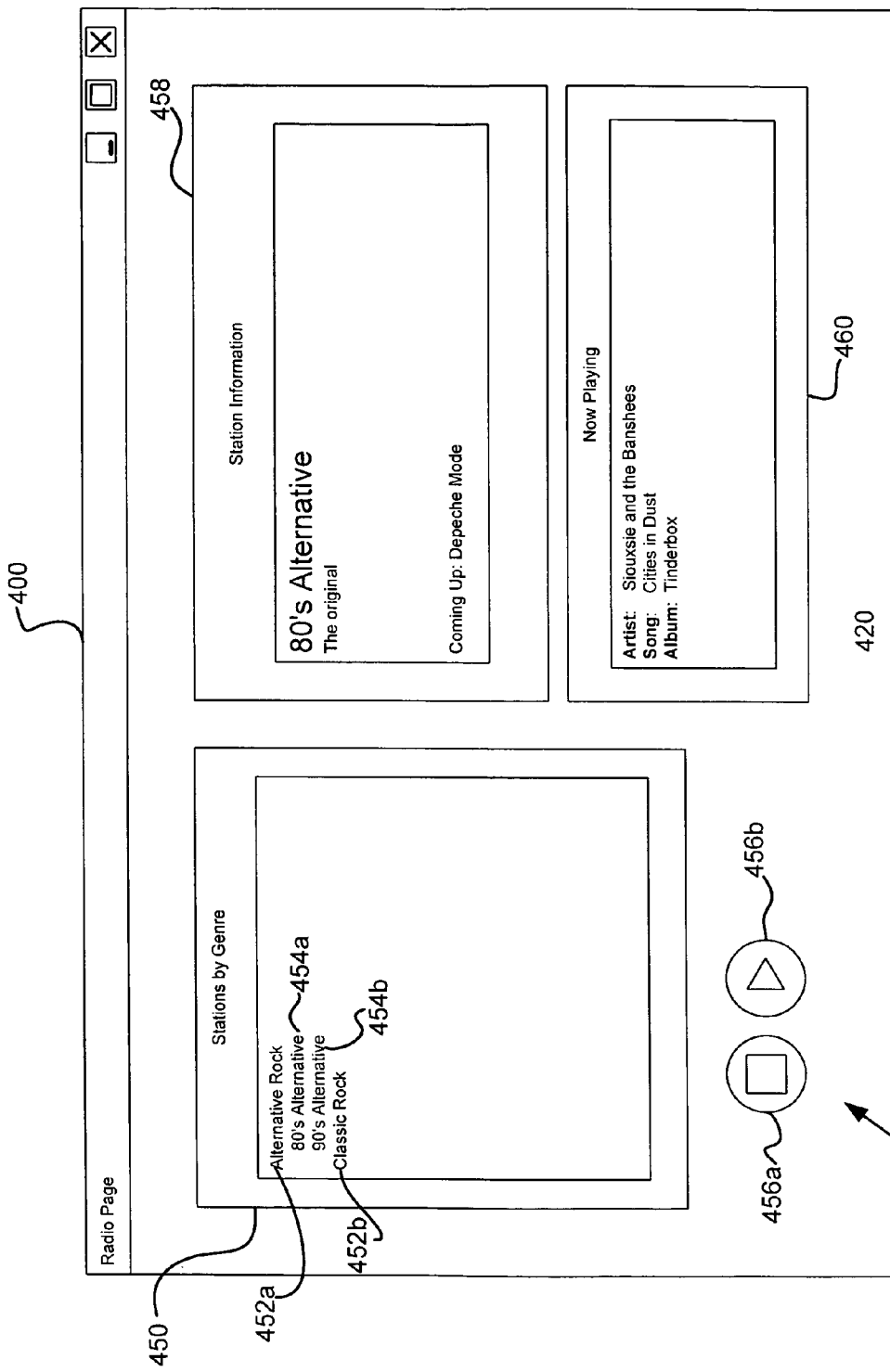
FIG. 4B shows an example of an interface that allows a user to navigate to one of the surface locations in the management hierarchy of FIG. 4A.

FIGS. 3D and 4B illustrate interfaces that present a graphical hierarchy of themes, where the graphical hierarchy allows the user to navigate to a theme that corresponds to a surface location and access programming content associated with that surface location. In these examples, the interfaces are web pages presented in a web browser (but in other implementations may be application interfaces) and only the lowest levels of the corresponding management hierarchies are surface locations (for example, only nodes 212a-212c, 214a-214c, and 216a-216c of management hierarchy 200 are surface locations).

Referring to FIG. 3D, in this example, the management hierarchy is the same as that depicted in FIG. 2, except that the top most node of the management hierarchy (that is, the node equivalent to home node 210) is a "video" node, as indicated by label 353 "Video Page." Making the top most node of the management hierarchy a "video" node represents that programming content associated with each node of the management hierarchy is video content (with or without accompanying audio).

In general, an interface 351 is presented in a browser 350 and includes a video rendering window 352 in which selected video content is displayed and associated control buttons 354 for controlling the playback of the selected video content. A section 356 presents a graphical hierarchy of themes and a section 362 presents video content associated with a surface location when a user selects a theme from section 356 that corresponds to the surface location.

The video rendering window 352 is part of a media client application embedded in the web page. The control buttons 354 may be the native controls of the media client application or may be HTML buttons tied to Javascript or other code that controls the media client application. The illustrated control buttons 354 include a rewind button 354a, a stop button 354b, a play button 354c, a pause button 354d, and a fast forward button 354e.

The graphical hierarchy presented in section 356 includes buttons 358 that represent higher level themes. The buttons illustrated include a music button 358a, a movies button 358b, and a current events button 358c.

When a user selects one of the buttons 358, the theme(s) under the selected theme is displayed in section 360. For example, as shown, when a user selects the music button 358a, the themes under the music node are displayed in section 360. In this case, alternative rock 360a, rock 360b, and R&B 360c are shown.

As described above, management nodes 214a, 214b, and 214c are surface locations. These nodes have themes that correspond to themes 360a, 360b, and 360c. Accordingly, when a user selects one of the themes 360a, 360b, or 360c, selections of the video content associated with the corresponding surface location are presented in section 362. In the example shown, a user has selected the alternative rock node 360a and, therefore, selections of the video content associated with the alternative rock management node 214a is presented in section 362.

There are three selections shown in the illustrated example. A first selection includes an identification 364a of the corresponding video content and a play button 364b that may be used to select the corresponding video content for presentation. The identification 364a may simply be words describing the video content, may be the first frame of the video content, a picture that identifies the video content, or any other identifier of the video content. Similarly, the second and third selections contain respective identifications 366a and 368a and respective play buttons 366b and 368b.

Thus, the user may use the elements presented in section 356 to navigate to a site location having a theme the user is interested in, and select particular programming content associated with the site location/theme using the elements in section 362. In this example, each theme in the graphical hierarchy of themes corresponds to a theme in management hierarchy 200; however, this need not be the case. Rather, themes other than those corresponding to a surface location may be different.

Referring to FIG. 4A, another example of a management hierarchy is shown. In this example, a management hierarchy 400 includes a top most node that is a "radio" node 410, representing that programming content associated with each node of the management hierarchy is streaming audio that simulates to one degree or another traditional broadcast radio stations. Underneath this top most node are genre nodes representing different genres of music or audio content: "alternative rock" node 412 and "classic rock" node 414. Underneath each of the genre nodes is a station node representing a particular radio station (that is, a particular audio stream), where the particular radio station may be designed around a particular theme within the corresponding genre (for example, the station may play music only by a particular artist within the genre, or may play music within the genre only from a certain period or within a certain class of the genre). The station nodes shown are an "80's alternative" node 412a and a "90's alternative" node 412b under the "alternative rock" node 412, and an "All Grateful Dead" node 414a and a "60's" node under the "classic rock" node 414.

Referring to FIG. 4B, an interface 420 may present a graphical hierarchy of themes, where the graphical hierarchy allows the user to navigate to a theme that corresponds to a surface location of management hierarchy 400 and access programming content associated with that surface location.

In this example the station nodes 412*a*, 412*b*, 414*a*, and 414*b* are the surface locations. The audio content associated with each surface location is queued and sent in a serial fashion on the audio stream so as to simulate a traditional broadcast radio station. Thus, for example, songs may be associated with a particular surface location. Particular songs from those associated with the surface location are then selected (for example, by a program that selects songs randomly or deterministically, or by a person selecting which songs will be played) and queued to be sent one at a time to media client applications that connect to the audio stream corresponding to the surface location. Accordingly, in this example, the user does not select particular pieces of content for presentation, but rather selects the theme corresponding to a surface location and the content associated with that surface location is continuously streamed to the media client application.

In general, an interface 420 is presented in a web browser 400 and includes a section 450 that presents a graphical hierarchy of themes, control buttons 456, a section 458 that displays information about the currently selected station, and a section 460 that displays information about the currently playing audio segment (for example, a song).

Section 450 displays genres 452*a*-452*b*. When a user selects a genres, the stations beneath the selected genre in the hierarchy of themes are displayed under the genre in a tree-like fashion. As shown, the alternative rock genre 454*a* has been selected, resulting in the stations 454*a*-454*c* being displayed.

When a user selects a station, for example, one of stations 454*a*-454*c*, section 458 displays information about the selected station and identifies which audio segment will be played next. Section 460 displays information about the currently playing audio segment, such as the artist, song, and album. When the user subsequently selects the play control button 456*b*, the currently playing audio segment is presented to the user. As the audio segments change, sections 458 and 460 are updated to reflect the currently playing audio segments and audio segments that are queued to be played next. The user may select a stop control button 456*a* to stop the audio content from being presented.

As with the example shown in FIG. 3D, in FIG. 4B each theme in the graphical hierarchy of themes corresponds to a theme in management hierarchy 400; however, this need not be the case.

Referring to FIG. 5, client systems 102, media page server 106, media state server 112, audience measurement server 116, scheduler 114, and content sources 108 and 110 may interact as follows in one implementation of system 100 that supports on-demand streaming. Other implementations of system 100 may support live streaming content and/or downloaded content.

Client system 102 sends a request for a media page to server 106 (502). The media page is, for example, a web page that corresponds to a surface location in a management hierarchy or a web page that provides an interface that allows a user to navigate to various surface locations in a management hierarchy. Accordingly, the web page includes links to selections of programming content which a user of client system 102 can select for presentation. Server 106 returns the media page to client system 102 (504), which presents the media page to the user using, for example, a stand alone media client application or a web browser.

When a user selects one of the selections of programming content (506), the media client application sends a request for content to media state server 112 (502). The request generally indicates the programming content selected and the surface location from which it is selected, and may indicate other parameters.

When media state server 112 receives the request from the media client application, media state server 112 determines and accesses an appropriate template. In general, a template outlines the desired media experiences for programming content and advertising content presented to the user. For instance, a template may describe how many pieces of advertising content should be presented with the programming content, the types of advertising content (for example, previews, advertisements, or teasers), and the order in which the programming content and advertising content should be presented. As an example, the template may indicate the following order: (1) a branding segment; (2) the selected programming content; and (3) an advertisement. Which template applies may depend, for instance, on the surface point from which the programming content was requested, the particular programming content selected, and/or the category of the particular programming media. Other parameters also may be used to determine which template applies, such as those described in application Ser. No. 11/023,638.

After accessing the appropriate template, media state server 112 sends to scheduler 114 a request for the advertising content (510). The request includes an indication of the types of advertising content needed and the surface location from which the programming content was selected. For instance, for the exemplary template described above, the request includes (1) an indication that a branding segment is needed, (2) and indication that an advertisement is needed, and (3) the surface location from which the programming content was selected.

Upon receiving the request for a selection, scheduler 114 selects the appropriate advertising content, which may include, for example, an appropriate branding segment and an appropriate advertisement (512). Some advertising content, such as the branding segment, may remain the same for a surface location. However, other advertising content, such as advertisements, are dynamically selected for a surface location depending on the advertising campaigns allocated to the surface location. To select such a piece of advertising content, scheduler 114 may store the parameters of the various advertising campaigns, such as the surface locations to which they are allocated, the number of times the advertising content associated with each campaign should be presented during a time frame, and when the campaigns are scheduled. When a request for such advertising content is received from media state server 112, scheduler 114 may determine which advertising campaigns are allocated to the surface location indicated in the request and then selects a particular advertising campaign and advertising content associated with that campaign in a manner that attempts to insure that the criteria for all of the available advertising campaigns are met. For example, scheduler 114 may use heuristic rules that select advertising campaigns in a manner that attempts to satisfy the requirements of the various campaigns.

For instance, a set of campaigns may be selected based on criteria, such as, for example, the surface location, date, and time of the request for the programming content. Scheduler 114 may then select the campaign in the set that is the behind on the number of times the advertising content should be presented during a time frame. As an example, if two campaigns each have a requirement that the associated advertising content be presented 3000 times over 3 days, and on the start of the second day the advertising content of the first campaign has only been presented 500 times, while the advertising content of the second one has been presented 1000 times, then the first campaign will be selected. Other rules may disqualify the first campaign. For example, if the advertising campaign specifies that the advertising content can not be shown to the same person more than once in a given period, and the campaign has already been shown to the user, then the other campaign may be presented, even though it is not as far behind.

Once the specific pieces of advertising content are selected, scheduler 114 then returns to the media state server 112 the locations, for example URLs, or other identification of the selected advertising content in advertising media source 110 (514). For the exemplary template, scheduler 114 returns the URLs for the selected branding segment and the selected advertisement.

Media state server 112 also obtains the location (for example URL) of the programming content selected by the user. Media state server 112 obtains the URL, for example, by querying a database based on an indication of the selected programming content in the request (502) from the client system 102. Media state server 112 arranges the URLs into a playlist that contains the URLs for the branding segment, the programming content, and the advertisement in the order indicated by the template.

Media state server 112 then returns the playlist to the media client application (516). Based on the playlist, the media client application then requests (518) the media segments from the appropriate locations in content sources 108 and 110. The content sources 108 and 110 return (520) the media segments requested, which are presented by the client system.

Thus, for the playlist based on the exemplary template, the media client application executing on client system 102 uses the URL for the branding segment to request the branding segment from the advertising content source 110 (518), which returns the branding segment to client system 102 for presentation (520).

After the client system 102 presents the branding segment, the media client application processes the URL for the selected programming content. As a result, the media client application requests (518) the selected programming content from programming content source 108, which returns (520) the selected programming content to the media client application for presentation. Once the programming content is presented by client system 102, the URL for the advertisement is processed. This results in the media client application requesting (518) the advertisement from the advertising content source 110 and the advertising content source 110 returning the advertisement to the client system 102 for presentation (520). While the previous discussion describes the media client application as processing the next URL after the previous piece of content is presented, the media client application may begin processing one or more of the subsequent URLs on the playlist prior to finishing the presentation of a piece of content.

In addition, the media client application executing on client system 102 periodically or aperiodically transmits one or more status messages to audience measurement server 116 (522) as the media client application presents the dynamic content. In other implementations, the status messages may be sent before or after the media client application presents the dynamic content.

Generally, the status messages allow audience measurement system 116 to track the amount of content presented on client system 102 from a particular surface location and, more generally, may allow a view of the audience behavior to be synthesized. Status messages generally include an indication of the surface location from which programming content was selected, and may indicate a brand associated with that surface location.

Status messages also may identify the content being presented and may indicate a particular state of the media client application. For example, the status messages may indicate the beginning of a presentation of content, continuing presentation, or the end of presentation. Status messages also may indicate the dynamic content is being fast forwarded, rewound, paused, or played, and/or whether the media client application is in the foreground or background.

Some state information regarding the media client application may be inferred based on subsequent state updates. For instance, it may be inferred that the media client application has stopped presenting content when a subsequent state update indicates that the media client application has connected to different content for presentation.

Status messages also may include an identifier that uniquely identifies the client system sending the status message. For example, a globally unique identifier (GUID) may be generated and included in the status messages.

To determine the amount of time that content is presented from a surface location, the time that status messages are received may be recorded by audience measurement system 116. Assuming negligible transmission time from client system 102 to audience measurement system 116, the recorded times indicate the time at which content is presented on client system 102 (assuming any appropriate conversion, such as to a different time zone). Alternatively, the status messages may include a time stamp that indicates the time at which content is presented on client system 102. As another alternative, the status messages themselves may indicate the amount of time a particular piece of dynamic content was presented.

Other manners of implementing status messages are described in application Ser. No. 11/023,631, filed Dec. 29, 2004 and entitled "Auditing Of Content Related Events" application Ser. No. 11/023,631 is hereby incorporated herein by reference for all purposes.

FIGS. 6-12 generally show one implementation of how various components in system 100 may cooperate to estimate inventory for the management hierarchy shown in FIG. 4A based on status messages sent by client systems 102. However, as described above, and further described below, other techniques may be used to estimate or measure the cumulative amount of time content from a node was presented to client systems 102 during a time period.

In the implementation shown in FIGS. 6-12, the inventory is estimated on an hourly basis for each day of the week, and the estimate for a given hour of a particular day of the week is based on the same hour and day in prior weeks. For example, an estimate of the inventory during 9 am-10 am on a future Monday is based on the actual or estimated amount of content consumed between 9 am-10 am on the Mondays previous to that future Monday.

The implementation shown is also based on advertising campaigns that indicate the number of times the creative is to be presented over a number of days, a target group, and a time period when the advertising campaign should be completed. For example, the advertising campaign may indicate that the creative be presented 3000 times over 2 days, targeted to youths, and completed by the end of February. In addition, the implementation is based on a scheduler 114 that tries to evenly spread all presentations of the creative out evenly over all days remaining in the advertising campaign. Other implementations may vary, however, depending on the parameters of the advertising campaigns and how the scheduler attempts to schedule presentations of the creative.

Also, in the implementation described, the spot load is expressed as the number of creatives or ads presented to a member per length of time dynamic content is presented to the member. Similarly, the advertising inventory is expressed in terms of "impressions," where an impression is generally a presentation of a creative to a member of the audience. Because it may be difficult to determine whether the advertising unit was actually presented to the member, an impression may more generally be considered to be the presentation of a creative on a client system.

Figure 8A:
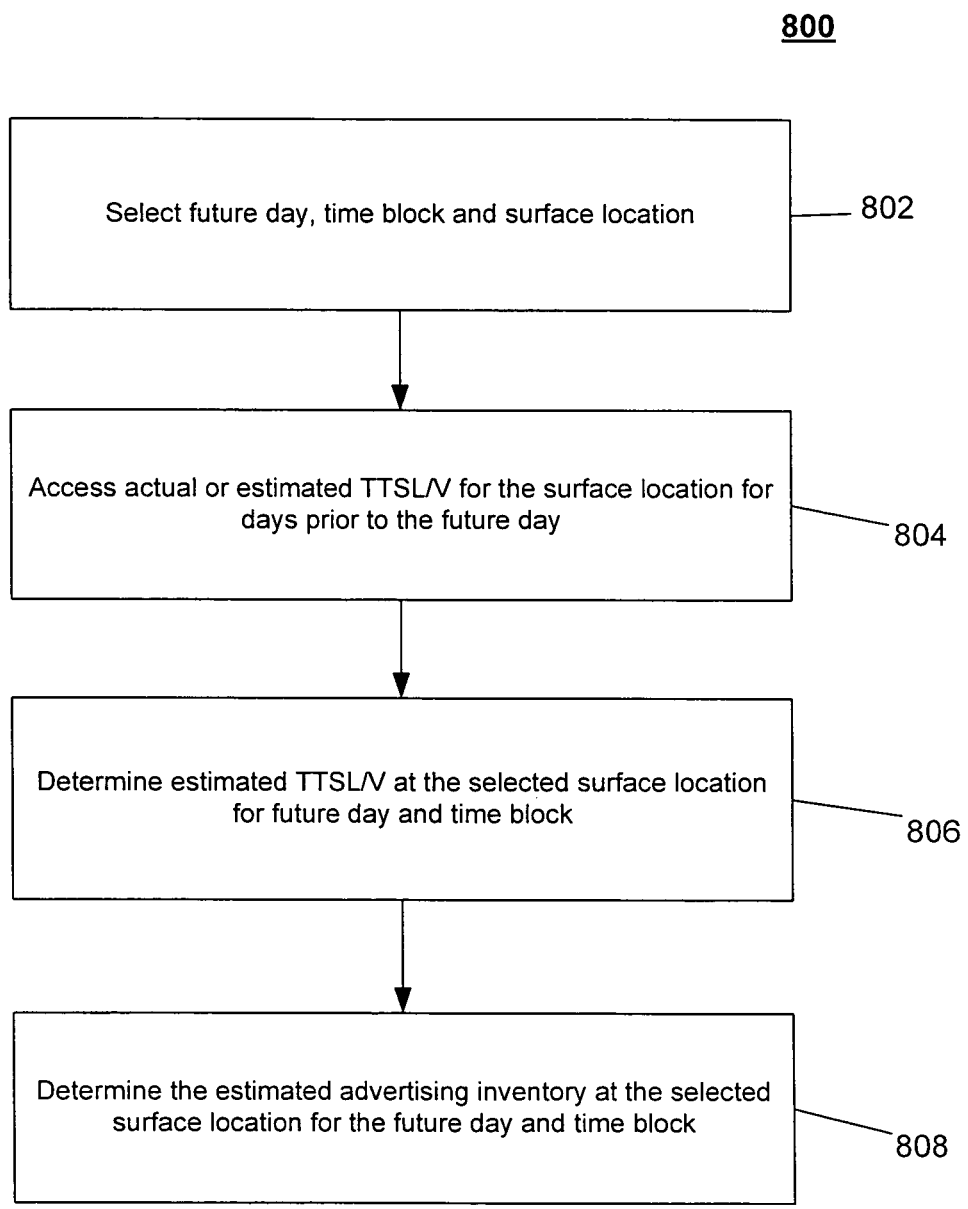
Figure 9:
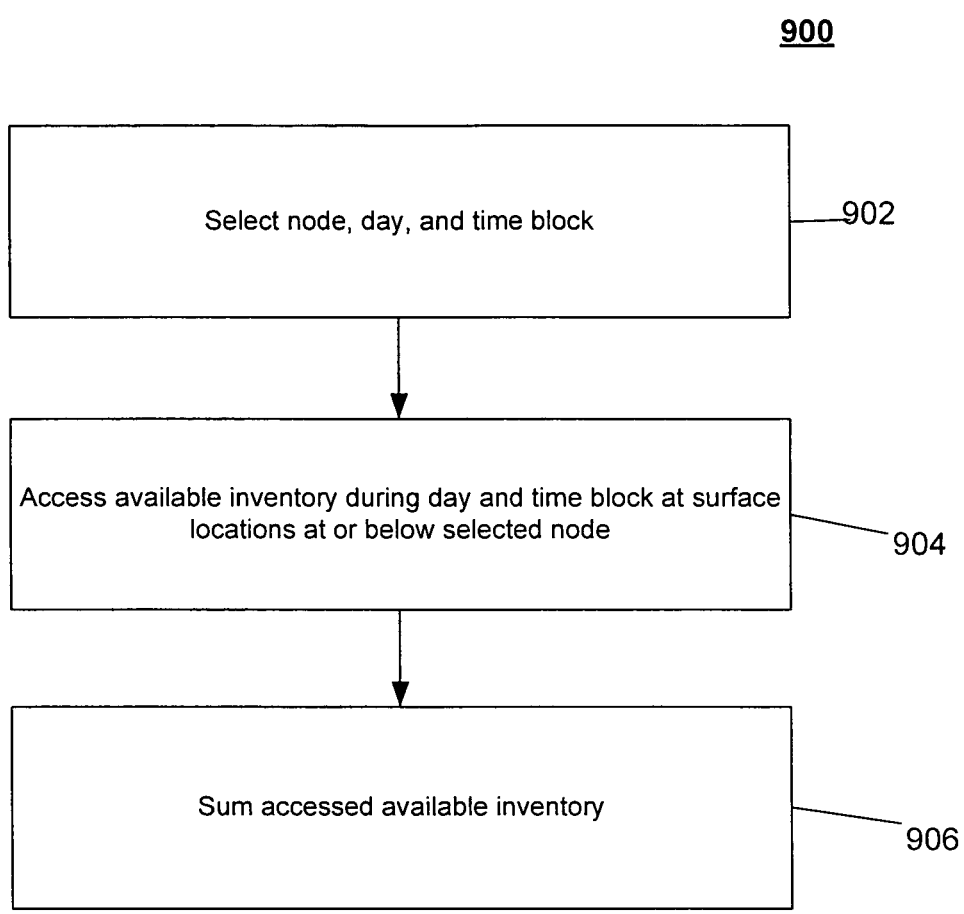

As an overview, audience measurement server 116 tracks the amount of time dynamic content is presented to a member of the audience and the particular surface location from which the dynamic content was presented (FIG. 6). This information is then used to calculate the cumulative amount of time dynamic content from a particular surface location was presented to members of the audience on an hourly basis (referred to as the total time spent listening/viewing or TTSL/V) (FIG. 7). For each of the surface locations, inventory manager 120 uses the TTSL/V information (some of which may be estimated depending on how far in the future the estimate extends) to forecast the future available inventory for the future days on an hourly basis (FIGS. 8a-8c). Inventory manager 120 then estimates the inventory available at the various nodes of the management hierarchy based on the available inventory for each surface location (FIG. 9).

The estimates at the various nodes may be used to help to insure that orders or tentative orders for advertising campaigns can be met. One or more interfaces may be provided to allow a user (referred to as a "traffick manager") to view current estimates of the inventory at various nodes and tentatively input insertion orders to obtain estimates of the advertising inventory consumed at various nodes by the insertion order (FIGS. 13-17).

For instance, the traffick manager may review the currently available inventory to estimate how much can be sold and inform the advertising sales team about how much is available. Alternatively, or additionally, the traffick manager may tentatively schedule an insertion order and have the inventory manager 120 estimate the amount of inventory consumed at the various nodes to which the advertising campaign is allocated (FIGS. 10-13). If the result shows that there is insufficient inventory, the traffick manager may then try to reschedule the insertion order, reschedule other insertion orders in a manner that results in sufficient estimated inventory, or accept the schedule anyways. If rescheduling the current or other insertion orders does not solve the lack of inventory, the traffick manager may reject this advertising campaign, inform the advertising sales team about how much inventory is available and have them try to adjust the current order, pick a schedule regardless of whether inventory is available, or increase inventory by increasing the spot load. If the spot load is modified up or down, then the inventory can be recalculated for the affected nodes (FIGS. 8a-9) and the traffick manager can then try to schedule the insertion order again to see how much inventory is consumed (FIGS. 10-13).

More specifically, referring to FIG. 6, based on status messages such as those described above, audience measurement server 116 may generate a table 600 for each unique member. As shown, table 600 includes a column 602 for the user ID (for example, GUID). A column 604 includes the time a status message was received or the time stamp included in the status message. The next column 606 includes the type of status message received, for example, a connect or end message. Column 608 includes a specific identifier for the segment of dynamic content presented, while column 610 indicates the surface location from which the member selected the programming content. Column 612 indicates the brand associated with the surface location.

Thus, in the example shown, the user selected the "90's Alternative" station from the "alternative rock" surface location (for example, using the interface shown in FIG. 4B). Based on this selection, media state server 112 provided the media client application with a playlist that included (1) a station ID; (2) a shampoo commercial; and (3) the selected programming content. Accordingly, status messages were sent as each of these pieces of content were presented, and the status messages included an identification of the "90's alternative" surface location because that was the surface location from which the member selected the programming content. If the member requested additional content from the "90's alternative" surface location, or another surface location, table 600 could be continued.

Referring to FIG. 7, audience measurement server 116 may use the information from the status messages to calculate the cumulative amount of time dynamic content from a particular surface location was presented to members of an audience on an hourly basis for a given day. The calculated TTSL/V information is then stored in audience measurement database 118 for access by inventory manager 120 to estimate future available inventory and provide other inventory management functions.

The example in FIG. 7 shows the TTSL/V for the "90's alternative" surface location between three one hour time blocks: 9 am-10 am, 10 am-11 am, and 11 am-12 pm. For instance, between 9 am-10 am, the calculated TTSL/V is 100 minutes. The 100 minutes includes the 6 minutes from the member with GUID 123 in table 600 (assuming table 600 indicates data for February 2).

FIGS. 8a-9 show examples and processes that may be performed by inventory manager 120 in estimating inventory at a node of the management hierarchy for a particular future day and time block.

Referring to FIG. 8a, inventory manager 120 may implement a process 800 that uses the TTSL/V information calculated by audience measurement server 116 to estimate the future available inventory at a surface location during a future day and time block.

Inventory manager 120 selects a future day (for example, Monday, February 1), time block (for example, 9 am-10 am), acid surface location (for example, "90's alternative") (802). Inventory manager 120 then accesses TTSL/V data at the selected surface location for the same time block and day in the weeks prior to the future day (for example, TTSL/V data at the "90's alternative" surface location during 9 am-10 am for the Mondays prior to Monday, February 1) (804). The accessed TTSL/V data may be actual TTSL/V data accessed from audience measurement database 118 or may be estimated TTSL/V data. The TTSL/V data may include estimated TTSL/V data depending on how far in the future the forecast extends. For example, if the forecast is for Monday, February 1 and, at the time of the forecast, there are no other intervening Mondays, then the TTSL/V data may include only the actual TTSL/V data stored in the audience measurement database 118. However, if there is an intervening Monday, then the TTSL/V data for the intervening Monday may be estimated TTSL/V data, while the TTSL/V data for the Mondays before the intervening Monday may be actual TTSL/V data.

Inventory manager 120 then applies a forecasting algorithm to the accessed TTSL/V data to determine the estimated TTSL/V at the surface location for the future day and time block (806). Known forecasting algorithms may be used, such as the autoregressive moving average (ARMA) or the autoregressive integrated moving average (ARIMA).

Once the estimated TTSL/V at the surface location for the future day and time block is calculated, inventory manager 120 multiplies the desired spot load for the surface location during the future day and time block times the estimated TTSL/V for the future day and time block (808). The result is the estimated available advertising inventory at the surface location for the future day and time block. For instance, if the TTSL/V for the future day and time block is 100 hours and the spot load is 3 impressions per hour, then the estimated inventory is 300 impressions.

As an example of an implementation of process 800, inventory manager 120 selects the surface location of "90's alternative," the time block of 9 am-10 am, and future day of the next Monday (802). Inventory manager 120 the accesses the TTSL/V information for previous Mondays between 9 am-10 am (804) at the "90's alternative" surface location and applies a forecasting algorithm to this information to estimate the TTSL/V at the "90's alternative" surface location for the next Monday between 9 am-10 am (for instance, 50 hours) (806). Inventory manager 120 then multiplies the desired spot load for this day and time block (for instance, 3 impressions/hour) times the estimated TTSL/V for that period to determine the estimated advertising inventory available for the "90's alternative" surface location for next Monday during 9 am-10 am (for instance, 150 impressions) (808).

Process 800 may be repeated for each future day and time block for which an estimate is desired. For instance, if the inventory is to be estimated for the next month, process 800 may be performed for each day and time block in the next month.

FIG. 8b shows an example of the estimated TTSL/V calculated during 9 am-10 am for two surface locations ("90's alternative" and "80's alternative") for February 1 through February 7. FIG. 8c shows the resulting estimated advertising inventory calculated for the two surface locations based on their respective spot loads. For example, on February 1, the estimated TTSL/V for the "90's alternative" surface location is 400 hours, while the estimated TTSL/V for the "80's alternative" surface location is 200 hours. The spot load for the "90's alternative" surface location is 3 impressions/hour, while the spot load for the "80's alternative" surface location is 2 impressions/hour. Consequently, the estimated inventory for the "90's alternative" surface location for February 1 is 1200 impressions, while the estimated inventory for the "80's alternative" surface location for February 1 is 400 impressions.

Referring to FIG. 9, inventory manager 120 may implement a process 900 to determine the available inventory at a node on the management hierarchy for a day and time block. As described above, an advertising campaign may be allocated to a node in the management hierarchy that associates the campaign with the surface locations at or below the allocated node. Consequently, the inventory at a node may be the sum of the inventory available at surface locations at or below the node to which the campaign is allocated. Because the campaign is being allocated against nodes (and not necessarily individual surface locations), it may be desirable to view the inventory available at a node.

Inventory manager 120 selects a node on the management hierarchy and a day and time block (902). Inventory manager 120 then accesses the available inventory during the day and time block for the surface locations at or below the selected node (904) and sums the accessed inventory (906). This process may be performed for each node in the hierarchy, and for each day and time block for which inventory has been estimated.

As an example of process 900, and referring again to FIG. 8c, if the "90's alternative" and "80's alternative" are surface locations under the "alternative rock" node and the available advertising inventory at the "alternative rock" node is to be calculated for February 1 between 9 am-10 am, then inventory manager 120 accesses the available inventory for the "90's alternative" surface location (1200 impressions) and the available inventory for the "80's alternative" surface location (400 impressions) and sums these (1600 impressions) to obtain the advertising inventory available for the "alternative rock" management node.

FIGS. 10-13 show examples and processes that may be performed by inventory manager 120 to simulate the advertising inventory consumed by an accepted insertion order or pending insertion order. By entering a pending insertion order, the traffick manager may tentatively allocate an advertising campaign to various nodes (and, hence, surface locations), and schedule the time for the advertising campaign. When this is done, inventory manager 120 may implement process 1000 (FIG. 10) to simulate how the advertising campaign consumes advertising inventory at the various nodes during the days and time blocks the advertising campaign is scheduled and to determine how much of the estimated inventory would remain at the nodes if the insertion order is accepted. After reviewing the amount of advertising inventory expected to be consumed at the nodes and how much of the estimated inventory would remain at the nodes, the traffic manager may accept the pending insertion order, at which point the estimated inventory at the nodes is reduced by the simulated amount the advertising campaign would consume at each node.

Figure 10:
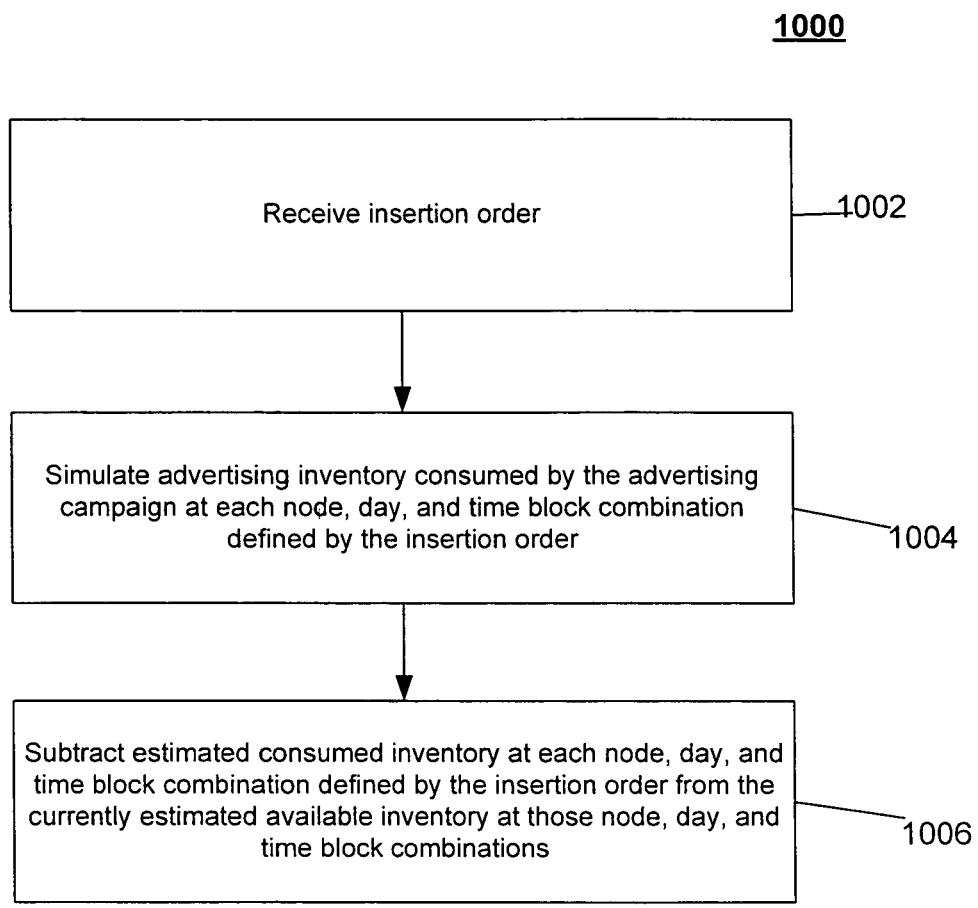

Referring to FIG. 10, the inventory manager 120 receives a pending insertion order (1002), which may define how many times the creative should be presented, which nodes the advertising campaign is allocated among, and when the advertising campaign is scheduled.

Figure 11:
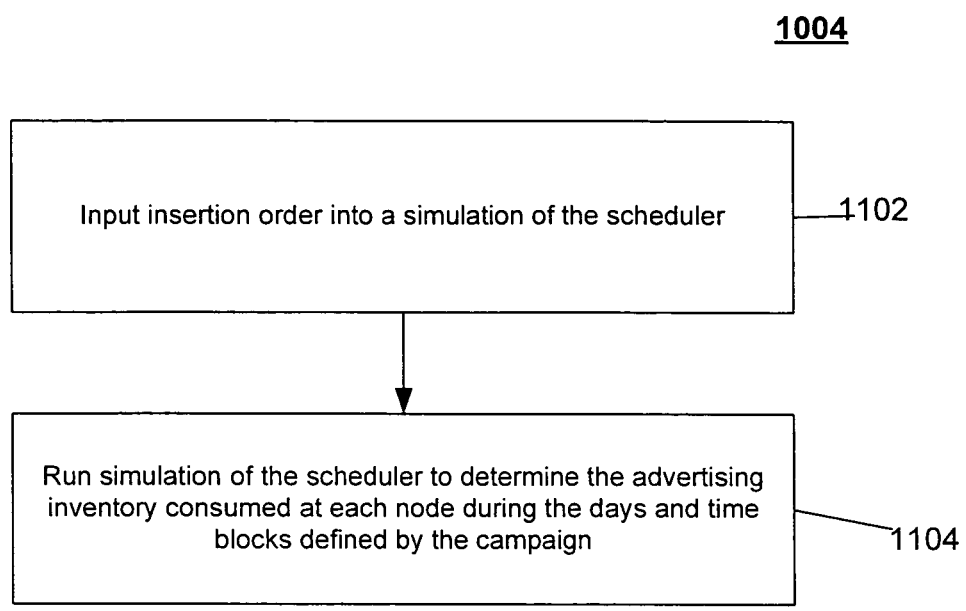
Figure 12:
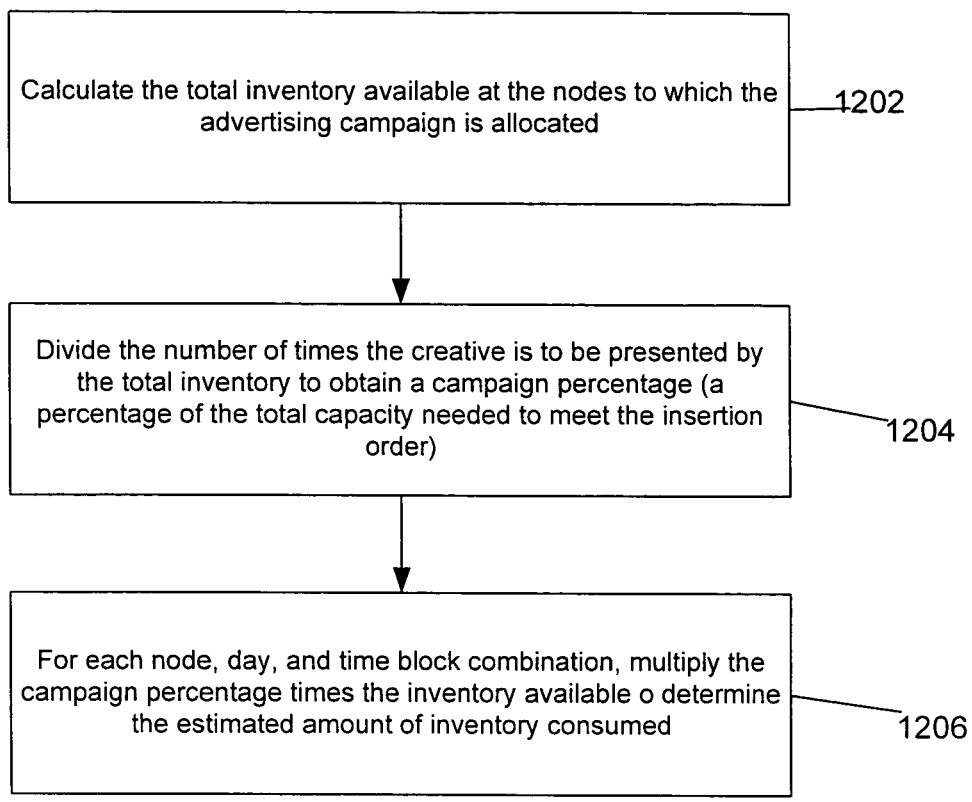

Based on the parameters of the insertion order, inventory manager 120 simulates the advertising inventory consumed by the insertion order for the various nodes to which the advertising campaign is allocated for the days and time blocks during which the advertising campaign is scheduled (1004). A number of techniques may be used to simulate the consumption of the advertising inventory. FIGS. 11 and 12 describe two implementations for doing so.

For each node, day, and time block combination, the inventory manager 120 subtracts the estimated consumed inventory for that node, day, and time block combination from the estimated inventory available at the node, day, and time block combination (1006). This results in an estimated remaining inventory for the nodes, days, and time blocks.

FIG. 11 shows one implementation of operation 1004 in process 1000. This operation may include inputting the received insertion order into a simulation of scheduler 114 (1102) and running the simulation to determine the advertising inventory consumed at each node, day, and time block combination defined by the insertion order (1104). The simulation may attempt to arrive at the actual scheduling that scheduler 114 would provide. In such implementations, the simulation may be relatively complex.

FIG. 12 shows another implementation of operation 1004 in process 1000 that attempts to allocate the insertion order among the node, day, and time block combinations in a manner proportional to the estimated available inventory at each node, time, and day combination. Inventory manager 120 may calculate the total inventory available at the nodes to which the advertising campaign is allocated for the days and time blocks during which the advertising campaign is scheduled (1202). Inventory manager 120 then divides the number of times the creative is to be presented by the total inventory to obtain a campaign percentage (that is, a percentage of the total inventory needed to present the creative the requested number of times) (1204). For each node, day, and time block combination, the inventory manager 120 multiplies the campaign percentage times the inventory available at the node, day, and time block combination to determine the estimated amount of inventory consumed at the node, day, and time block combination (1206).

FIG. 13 shows an example of the process shown in FIG. 12. In the example of FIG. 13, there are two insertion orders: order 1 and order 2. Order 1 requires that the creative be presented a combined 5000 times over Day 1, Day 2, and Day 3 and is scheduled between 9 am-11 am on the "alternative rock" node (see tables 1302 and 1304) and between 9 am-10 am on the "classic rock" node (see table 1306). Order 2 requires the creative to be presented 2000 times over Day 1 and Day 2 and is scheduled between 9 am-11 am on the "alternative rock" node.

Table 1302 shows the estimated inventory available and consumed at the "alternative rock" node during the time block 9 am-10 am, while table 1304 shows the estimated inventory available and consumed at the "alternative rock" node during the time block 10 am-11 am. Table 1306 shows the estimated inventory available and consumed at the "classic rock" node during 9 am-10 am.

With respect to the "alternative rock" node during 9 am-10 am, row 1302a shows that the available inventory for Day 1, Day 2, and Day 3 during this time block is 1000 impressions, 2000 impressions, and 3000 impressions, respectively. Row 1302b shows the estimated portion (in number of impressions) of the inventory consumed by order 1 at the "alternative rock" node for each of Day 1, Day 2, and Day 3 during the 9 am-10 am time block. Row 1302c shows the estimated portion of the inventory consumed by order 2 at the "alternative rock" node for each of Day 1 and Day 2 during the 9 am-10 am time block.

Similarly, with respect to the "alternative rock" node during 10 am-11 am, row 1304a shows that the available inventory for Day 1, Day 2, and Day 3 during this time block is 2000 impressions, 1000 impressions, and 1000 impressions respectively. Row 1304b shows the estimated portion of the inventory consumed for order 1, while row 1304c shows the estimated portion of the inventory consumed for order 2.

With respect to the "classic rock" node during 9 am-10 am, row 1306a shows that the available inventory for Day 1, Day 2, and Day 3 during this time block is 2000 impressions, 1000 impressions, and 1000 impressions respectively. Row 1306b shows the estimated portion of the inventory consumed by order 1 at the "classic rock" node for each of Day 1, Day 2, and Day 3 during the 9 am-10 am time block.

As shown in table 1302, the estimated portion of the inventory consumed by order 1 at the "alternative rock" node for Day 1 during the 9 am-10 am time block is 333 impressions. This is calculated by first summing the inventory available for each combination of node, day, and time block (1202). Thus, in this example, this is the sum of the inventory at the "alternative rock" and "classic rock" nodes over Day 1, Day 2, and Day 3 during the 9 am-10 am time block and available inventory at the "alternative rock" node over Day 1, Day 2, and Day 3 during the 10 am-11 am time block, which is 1000+2000+3000+2000+1000+1000+ 2000+1000+2000=15000. The total number of times the creative is to be shown is then divided by the total inventory (1204), which in this case is 5000 divided by 15000. This provides a campaign percentage of one-third. The campaign percentage is then multiplied by the inventory available at each combination of node, day, and time period, with the result being the estimated inventory consumed for that combination of node, day, and time period (1206). Thus, for Day 1 during 9 am-10 am at the "alternative rock" node, 1000 impressions (available inventory for Day 1 between 9 am-10 am) is multiplied by one-third (campaign percentage), which results in an estimate of 333 impressions being consumed from the inventory for Day 1 during the 9 am-10 am time block. As can be seen in row 1302b, this procedure also results in an estimate of 667 impressions consumed for Day 2 between 9 am-10 am, and 1000 impressions consumed for Day 3. Similarly, as can be seen in row 1304b of table 1304, this procedure also results in an estimate of 667 impressions consumed at the "alternative rock" node for Day 1 between 10 am-11 am, 333 impressions for Day 2 between 10 am-11 am, and 333 impressions for Day 3 between 10 am-11 am. Lastly, as can be seen in row 1306b of table 1306, this procedure results in an estimate of 667 impressions consumed at the "classic rock" node for Day 1 between 9 am-10 am, 333 impressions for Day 2 between 9 am-10 am, and 667 impressions for Day 3 between 9 am-10 am The process is similar for order 2, except that the total inventory would be calculated based on the two days that order 2 is scheduled and the campaign percentage would be multiplied by the inventory available in each of those two days. Thus, for order 2 over Day 1 and Day 2 during 9 am-11 am on the "alternative rock" node, the total inventory is 1000+2000+2000+1000=6000 impressions. The campaign percentage is then equal to 2000 divided by 6000, or one-third. For Day 1 between 9 am-10 am at the "alternative rock" node, the estimated inventory consumed by order 2 is then 333 impressions and for Day 2 between 9 am-11 am the estimated inventory consumed is 667 impressions. Similarly, at the "alternative rock" node between 10 am-11 am, the estimated amount consumed for Day 1 is 667 impressions and for Day 2 is 333 impressions.

Both operations shown in FIGS. 11 and 12 may be performed to estimate the inventory consumed by a campaign, and a view showing results based on both techniques may be provided to the user. Implementing the operation illustrated in FIG. 11 (that is, simulating the scheduler) may present an overly optimistic view of available inventory, while the operation illustrated in FIG. 12 (proportionally allocating) may present an overly pessimistic view of available inventory. Thus, providing the results of both operations to the traffick manager may provide the traffick manager with high and low values of the estimated inventory consumed/remaining available.

FIGS. 14-17 illustrate examples of interfaces that may be provided to the traffick manager for entering pending insertion orders and viewing the estimated inventory and insertion orders for various time frames and nodes of the management hierarchy. The interfaces shown also allow the traffick manager to view the actual numbers of impressions delivered in the past.

Figure 14:
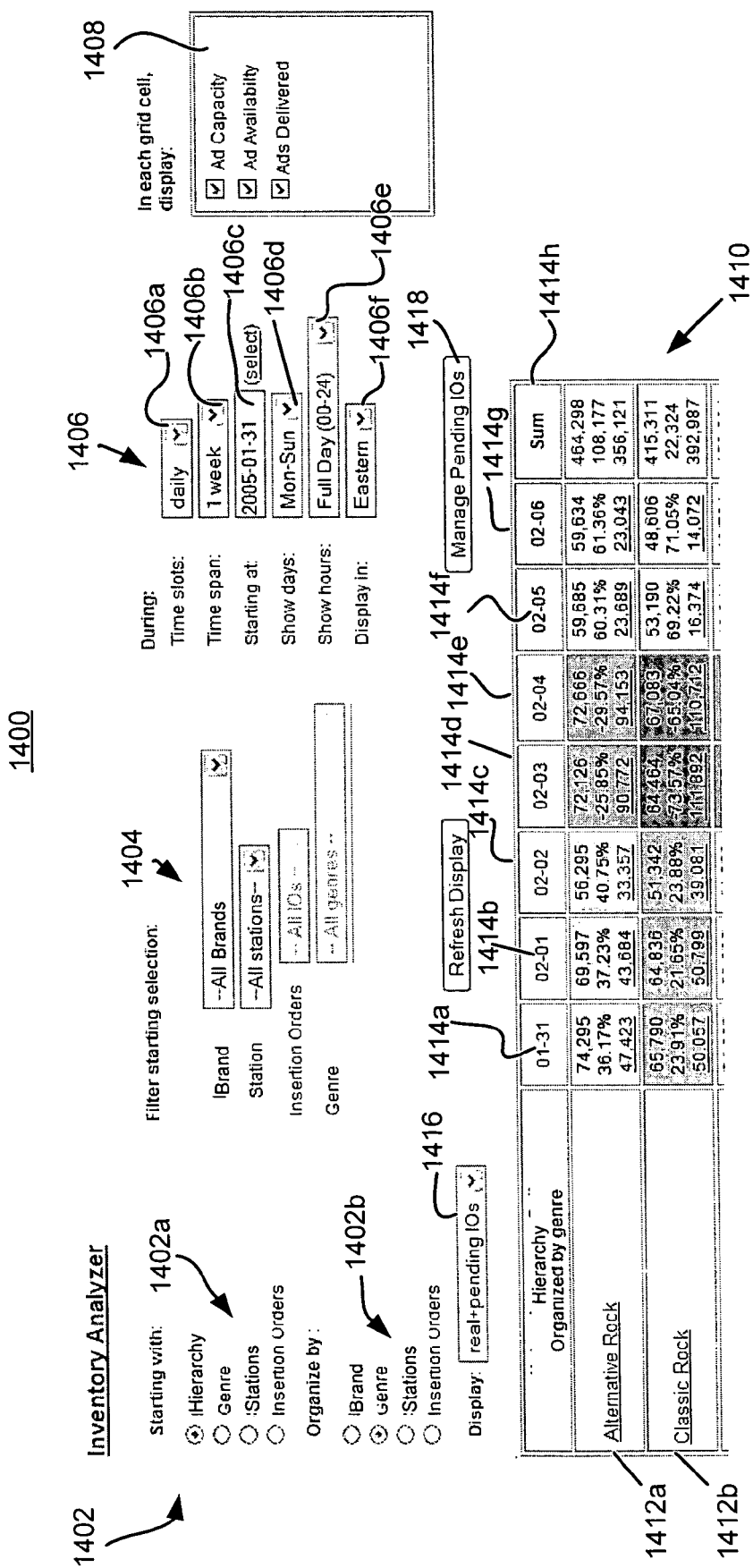
FIGS. 14-17 illustrate examples of interfaces that may be provided to a traffick manager for entering pending insertion orders and viewing the estimated inventory and insertion orders for various time frames and nodes of a management hierarchy.

Referring to FIG. 14, an interface 1400 allows the traffick manager to view estimated inventory available and insertion orders for various time frames and nodes in the management hierarchy of FIG. 4A. Interface 1400 includes a section 1402 that allows the traffick manager to select levels of the management hierarchy or insertion orders for which estimated inventory or actual delivered impressions are displayed. A section 1404 allows the traffick manager to select particular nodes in the management hierarchy, brands, or insertion orders for which estimated inventory or actual delivered impressions are displayed. A section 1406 allows the traffick manager to select the time frame and time blocks for which estimated inventory or actual delivered impressions are displayed. A section 1408 allows the traffick manager to select what information is displayed, for example, inventory generally available, remaining available inventory, or estimated inventory consumed. A grid 1410 shows the appropriate information based on the selections made using sections 1402-1408.

Section 1402 includes a section 1402a that allows the traffick manager to select either a starting level of the hierarchy (for example, top of hierarchy, genre nodes, or station nodes) or to start with insertion orders. A second section 1402b allows the traffic manager to then select which nodes under the starting level to display (for example, the nodes corresponding to a particular theme or that are managed under a particular brand) or to display the insertion orders that are allocated to nodes under the starting level.

Section 1404 includes various drop-down boxes corresponding to brand, station node, insertion order, or genre node. These drop-down boxes allow the traffick manager to select either all or a particular brand, station node, insertion order, or genre node, depending on the selections made in section 1402. The information displayed in grid 1410 is then filtered to only display the particular selection.

Section 1406 includes a drop-down box 1406a that allows the traffic manager to select whether the information in grid 1410 is displayed on an hourly or daily basis. A drop-down box 1406b allows the traffick manager to then select the time span, that is, how many days are displayed, while a selection box 1406c allows the traffick manager to select the starting day of the time span. A drop-down box 1406d allows the traffick manager to display which days of the week in the time span are displayed. Section 1406 also includes a drop-down box 1406e that allows for the selection of the hours or block of hours that are displayed for a given day, and a drop-down box 1406f that allows for the selection of the time zone for the hours displayed.

Depending on the selections made in section 1406, the information displayed may represent actual numbers or predicted numbers, or both. In the event the starting day is in the past, the information displayed for past times in grid 1410 represents actual numbers, while the information displayed for the present and future times are estimated.

Section 1408 includes check boxes that allow the traffick manager to select what information is displayed in each cell of grid 1410. When the "ad capacity" check box is selected, each grid shows the total estimated or actual advertising inventory that is available if no campaigns were consuming inventory. The "ad availability" check box allows for the display of the actual or estimated remaining advertising inventory given the campaigns that are consuming inventory, while the "ads delivered" check box allows for the display of how many creatives have been or are expected to be delivered.

A drop-down box 1416 allows the traffick manager to select whether data is shown only for accepted insertion orders, pending insertion orders, or both. Selection of a button 1418 invokes the interface shown in FIG. 17, which allows the traffick manager to enter and edit pending insertion orders.

In interface 1400, the traffick manager has selected the top of the hierarchy with section 1402a and selected the genre nodes in section 1402b. The timeline selected in section 1406 shows daily (as opposed to hourly) time slots, extending for one week from January 31, and shows all days. Section 1408 has been used to select the display of available inventory, remaining inventory, and estimated inventory consumed in each cell of grid 1410.

Consequently, grid 1410 contains rows 1412a and 1412b for each genre node, and columns 1414a-1414g for each day starting from January 31 and extending a week. Each cell of grid 1410 displays, from top to bottom, (1) the available inventory for the day if no campaigns were consuming inventory; (2) the remaining inventory for the day (percentage of unallocated inventory); and (3) the number of impressions delivered or expected to be delivered for the day (that is, the advertising inventory consumed). These values may be calculated for the day by summing up these values calculated for each hour time block of the day. When the number of impressions expected to be delivered is greater than the estimated remaining inventory, the remaining inventory is shown as a negative percentage. In addition, each cell of grid 1410 may be shaded a particular color depending on the remaining advertising inventory for the day (for example, darker shades of red may be used for lower amounts of remaining inventory). A column 1414h shows the totals for each genre node, with the remaining inventory shown in number of available impressions rather than a percentage.

Figure 15:
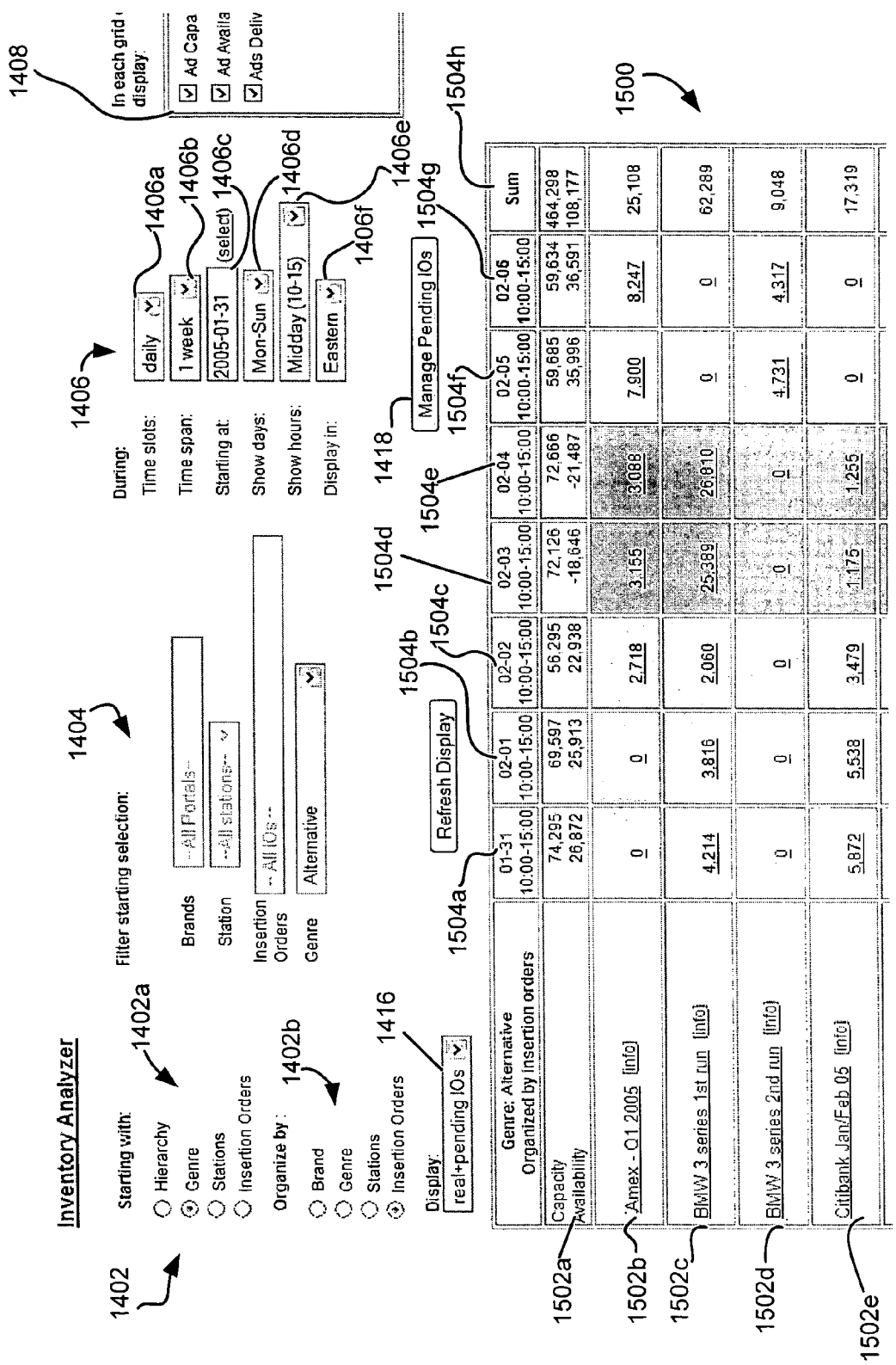

FIG. 15 shows interface 1400 when the traffick manager changes section 1402a to genre, changes 1402b to insertion orders, selects the "alternative rock" genre from the corresponding drop-down box in section 1404, and selects the midday block of hours (between 10 am-3 pm) in drop-down box 1406e. In this case, grid 1500 shows the actual or expected inventory consumed by the insertion orders that are associated with the "alternative rock" genre node. Grid 1500 includes rows 1502b-1502e for each insertion order and columns 1504a-1504g for each day between 10 am-3 pm starting from January 31 and extending a week. Each cell (except for the ones formed by row 1502a) then displays the actual or expected amount of inventory to be consumed by the corresponding insertion order. Because the insertion orders don't have a "capacity" (that is, an inventory) the total inventory and availability is shown grouped together for the entire genre in row 1502a.

Figure 16:
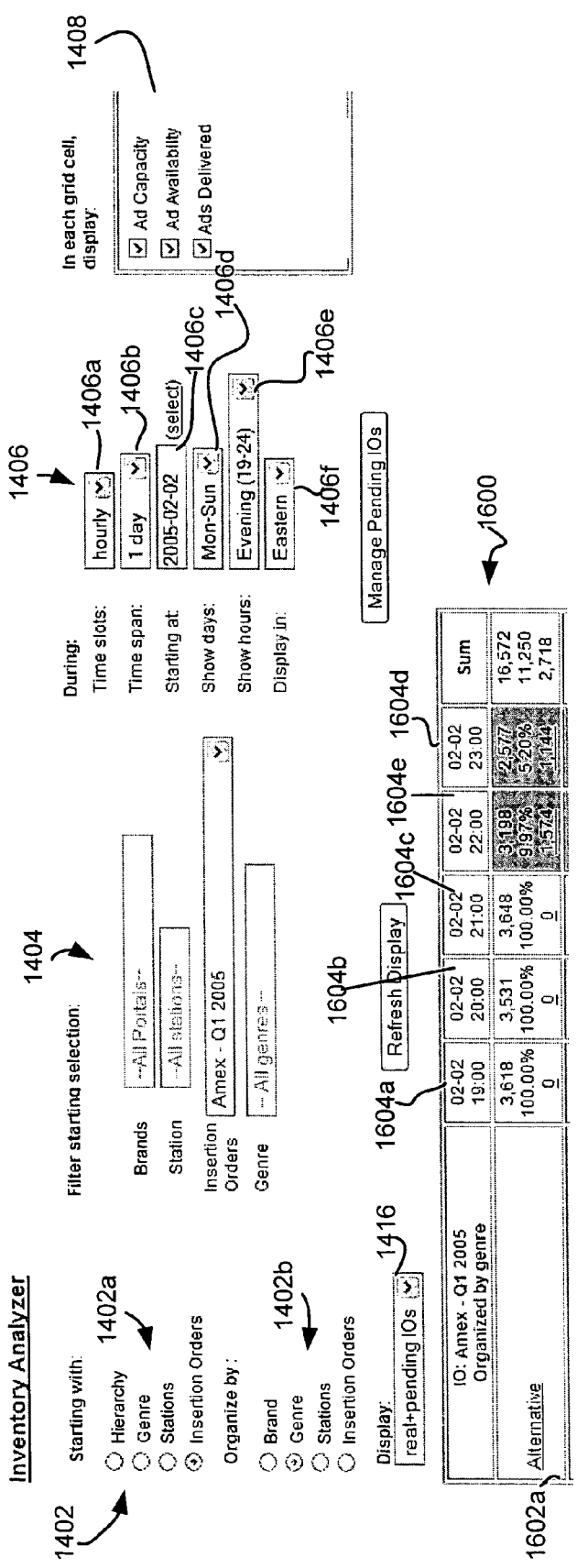

FIG. 16 shows interface 1400 for a different combination of selections. In this case, the traffick manager changes section 1402a to insertion orders, changes 1402b to genre, and selects the "Amex—Q1 2005" insertion order from the corresponding drop-down box in section 1404. The traffick manager has also changed the time frame and blocks displayed by selecting an hourly display in drop-down box 1406a, a single day for the time span in drop-down box 1406b, the start day to be February 2 in box 1406c, and the evening block of hours (between 7 pm-12 am) in drop-down box 1406e. Grid 1600 then displays the estimated or actual number of times the creative for the selected insertion order has been or will be presented during each hour between 7 pm and midnight on February 2. Grid 1600 includes a row 1602a for each genre node to which the "Amex—Q1 2005" insertion order is allocated, and columns 1604a-1604e for each hour between 7 pm and midnight on February 2. Each cell of grid 1600 displays, from top to bottom, (1) the available inventory at the genre node during the hour if no campaigns were consuming inventory; (2) remaining inventory at the genre node for the hour (percentage of unallocated inventory, with the sum being an absolute number); and (3) impressions delivered or expected to be delivered during the hour for the "Amex—Q1 2005" insertion order.

Figure 17:
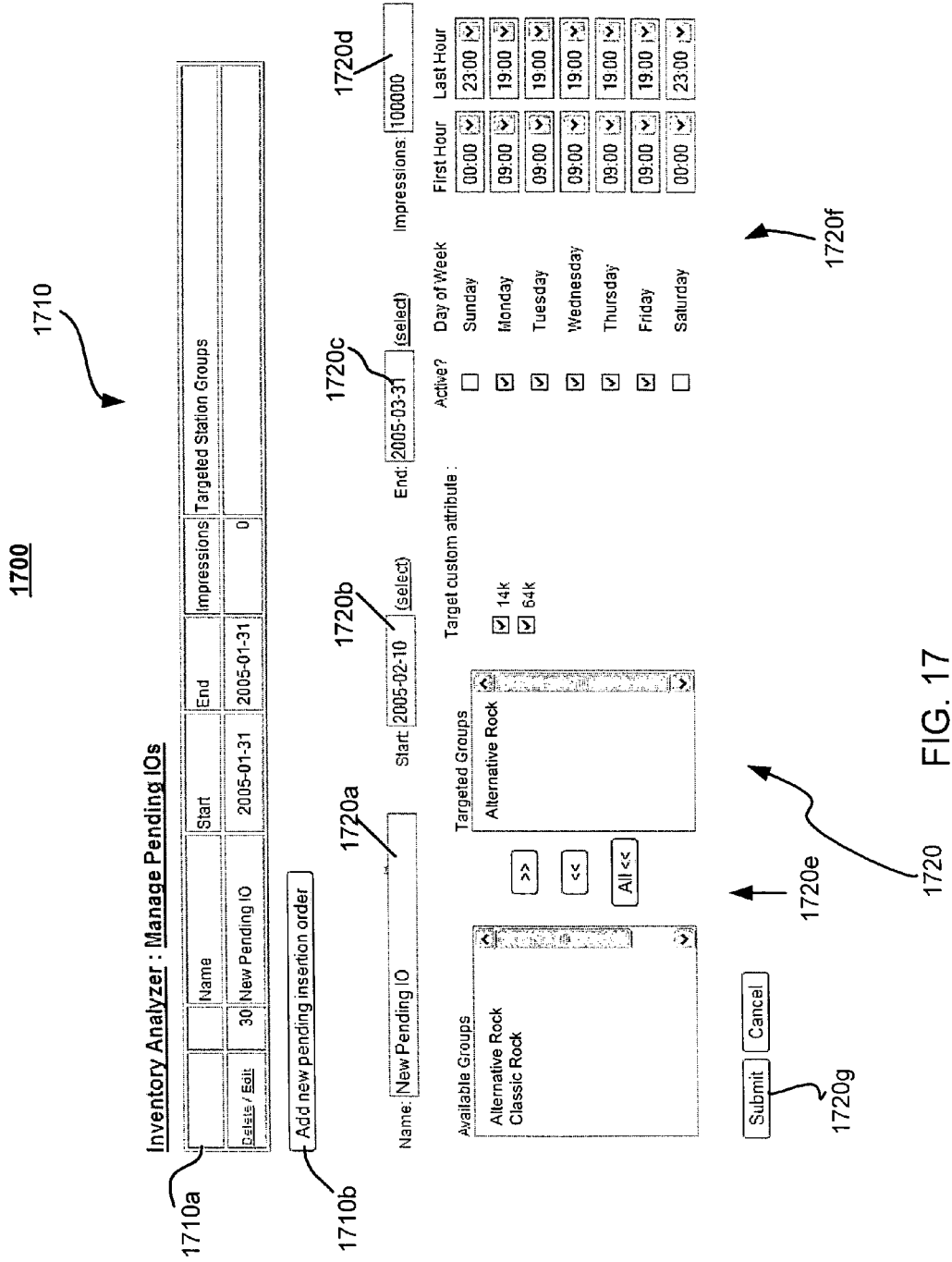

FIG. 17 shows an interface 1700 that is invoked when the traffick manager selects the "Manage Pending IOs" button 1418 on interface 1400. Interface 1700 allows the traffic manager to input or edit a pending insertion order, to allocate the pending insertion order to nodes in the management hierarchy, and to schedule the pending insertion order. Interface 1700 includes two parts: (1) a pending insertion order input area 1710 and (2) an edit area 1720 where the parameters of a pending insertion order can be modified.

Area 1710 includes a list 1710a of pending insertion orders from which the traffick manager can select for editing and a button 1710b that allows the traffick manager to add a new pending insertion order to the list. Edit area 1720 includes a text box 1720a for naming a pending insertion order, a selection box 1720b for selecting a start date of the insertion order, a selection box 1720c for selecting an end date of the insertion order, and a text box 1720d for entering the number of times the creative should be presented. Edit area also includes a section 1720e for selecting the nodes to which the insertion order is allocated, and a section 1720f for selecting the days and time blocks in the week during which the insertion order is to be active.

In the example shown, the traffic manager clicked on button 1710b to create the pending insertion order shown in section 1710 (named "New Pending IO" by default), which opened edit area 1720. The traffic manager then used section 1720e to allocate the insertion order to the "alternative rock" node, specified start and end dates using selection boxes 1720b and 1720c, specified 100,000 impressions to be delivered between those dates, and specified that the insertion order play on Monday through Friday, 9:00 AM to 7:00 PM. After clicking the submit button 1720g, inventory manager 120 will estimate the advertising inventory consumed by the insertion order during the days and time blocks it is scheduled, and the estimated inventory will be included in interface 1400 as appropriate.

While not shown, there may be an option on any of the above interfaces, or another interface, that allows the traffick manager to adjust the spot load for a node, or multiple nodes. Such an adjustment would impact, at least, the available inventory.

As an example of how a traffick manager may use one or more of the interfaces depicted in FIGS. 14-17, the traffick manager may receive an insertion order that requests 85,000 creatives be presented over two days, be targeted to youths, and be completed no later than February 6. Based on the targeted group, the traffick manager may decide to allocate the campaign to the "alternative rock" and "classic rock" nodes of management hierarchy 400. Before doing so, the traffick manager may use interface 1400 shown in FIG. 14 to review the currently available inventory at the "alternative rock" and "classic rock" nodes. Based on this review, the traffick manager may decide that January 31 and February 1 appear to have enough available inventory. The traffick manager then may use interface 1700 to tentatively schedule the advertising campaign for January 31 to February 1 on the "alternative rock" and "classic rock" nodes. After tentatively scheduling the advertising campaign at this time, the traffick manager may return to interface 1400 of FIG. 14 to review the impact of this schedule on the available inventory at those nodes on January 31 and February 1. If the result shows that there is insufficient inventory during these days, the traffick manager may then try to reschedule the insertion order. For example, the traffic manager may try to reschedule the insertion order for February 5 and February 6, which appear to have available inventory. If rescheduling the insertion order doe not solve the lack of inventory, the traffick manager may use alternative measures, such as rejecting this advertising campaign, informing the advertising sales team about how much inventory is available and have them try to adjust the current order, pick a schedule regardless of whether inventory is available, or increase inventory by increasing the spot load.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on one or more computer-usable storage media or devices (for example, CD-ROM, RAM, or magnetic disk). When read into the processor of the computer and executed, the instructions of the program cause the programmable computer to carry out the various operations described above.

A number of implementations have been described. Nevertheless, it will be understood that various modifications may be made. For example, while the foregoing has described the use the HTTP protocol and HTML, other standard or proprietary protocols may alternatively be used.

As another example, while status messages are described above for tracking the amount of time members of an audience spend viewing or listening to dynamic content from a node, other techniques may be used to measure or estimate this time. For instance, by noting how many creatives are delivered during an hour, an estimate of the TTSL/V for that hour can be calculated by dividing the number of creatives delivered by the spot load.

Alternatively, or additionally, as noted above, programming content source 108, advertising content source 110, or both, may send status messages to audience measurement server 116, which then may be used to estimate or measure the cumulative time. In one implementation, programming content source 108 periodically or aperiodically sends status messages indicating how many users are receiving content from a particular node. These status messages then may be used to measure the cumulative time for the audience during a time period. For example, programming content source 108 may have a number of users connected to the "90's alternative" station 412b and may send status messages whenever the audio segments switch from music to advertising content. In such a case, the following status messages indicating the following may be received from programming content source 108:

Time Station Node Audience count
12:01 90's Alternative 100
12:15 90's Alternative 90
12:30 90's Alternative 80
12:43 90's Alternative 90
12:54 90's Alternative 100

To estimate or measure the cumulative time for the audience between 12:00 and 13:00, the average of the audience counts is calculated. In this example, the average would be (100+90+80+90+100)/5=92 user hours between 12:00 and 13:00. The accuracy of this technique generally depends on how frequently the messages are sent by the programming content source 108, advertising content source 110, or both. When status messages from client systems 102 are used, the accuracy generally depends on the how accurately the status messages from client systems 102 record the time when a client system begins presenting content and the time when a client stops presenting content.

Also, in the implementation shown with respect to FIGS. 6-12, the inventory is estimated on an hourly basis for each day of the week. Estimating hourly may allow for various views of the estimated inventory, for example, per hour, block of hours, or daily. This may be desirable, for example, if it is possible to schedule advertising campaigns to be active only during certain hours of the day. In such a case, a person scheduling the advertising campaign may only desire to view an estimate of the inventory available during the hours the person wishes to schedule the campaign.

Inventory, however, may be estimated based on larger or smaller time blocks. Estimating based on smaller time blocks (for example, estimating the inventory for fifteen minute time blocks) may allow for views of finer granularity, such as, for example, per fifteen minutes, which may be desirable if advertising campaigns can be scheduled during the smaller time blocks. Estimating based on larger time blocks may reduce computing time and storage space and, therefore, may be desirable if finer levels of granularity are not wanted, for example, because advertising campaigns are not able to be scheduled on the smaller time basis (for instance, if advertising campaigns can only be scheduled for a day, without being able to be scheduled within specific hours of the day, then viewing estimated inventory per hour or block of hours may not be wanted).

In addition, in the implementation shown in FIGS. 6-12, the estimate for a given hour of a particular day of the week is based on the same hour and day in prior weeks. However, the previous time periods used to estimate inventory at a future time period may depend on the particular implementation. Generally, the time periods used may be those in which similar viewing or listening conditions are expected to exist, so as to help increase the accuracy of the forecast. Thus, for example, if viewing or listening conditions during an hour (or other time basis) are not expected to change significantly based on the particular day, then each previous day may be used to estimate the inventory for the next day during the hour. An example of such a scheme would be to estimate the inventory between 9 am-10 am on a future Monday based on the actual or estimated amount of content consumed between 9 am-10 am on the days previous to the future Monday.

In the implementation of FIGS. 6-12, the spot load is expressed as the number of creatives or ads presented to a member of the audience per length of time dynamic content is presented to the member, and advertising inventory is expressed in terms of "impressions." The spot load and inventory, however, may be expressed in a variety of ways. For example, the spot load may be expressed as the length of time advertising content is presented to a user per length of time dynamic content is presented to the user (for example, three minutes of advertising content per hour). The advertising inventory, for example, may similarly be expressed as the amount of time available to present advertising content. Other implementations may vary depending on how the spot load and/or advertising inventory is expressed.

Furthermore, elements of one or more implementations may be combined, deleted, supplemented, or modified to form further implementations. Accordingly, other implementations are within the scope of the following claims.

What is claimed is:

1. A computer-implemented method, comprising:
   receiving, by at least one processor, via a packet-switched network, from a media client application executed on a plurality of client devices, a plurality of status messages in response to dynamic programming content presented at a user-selected surface location on a web page via the media client application, each status message including (i) a unique identifier associated with a corresponding client device and (ii) a time stamp indicating a time at which the content is presented;
   determining, by the at least one processor, for each of the plurality of client devices, a cumulative amount of dynamic programming content presented at the user-selected surface location over a first time period based on the plurality of status messages;
   tracking, by the at least one processor, audience behavior data associated with the presented dynamic programming content based on the plurality of status messages, each status message indicating whether the presented dynamic programming content is being at least one of fast forwarded, paused, played, and skipped;
   estimating, by the at least one processor, a cumulative amount of time that dynamic programming content will be presented at the surface location on the web page during a second time period by applying a time series algorithm to data associated with the determined cumulative amount of time that dynamic programming content was presented at the surface location during the first time period, the second time period including a future date and a corresponding time block;
   estimating, by the at least one processor, an available inventory at the surface location by:
      calculating, for the surface location, a product of (i) a desired spot load for the second time period and (ii) the estimated cumulative amount of time that the dynamic programming content will be presented at the surface location on the web page during the second time period, wherein the desired spot load is a number of creative content items to be presented per length of time a dynamic programming content is to be presented during the second time period;
   selecting, by the at least one processor, an advertising campaign for the surface location during the second time period based on the estimated available inventory, the tracked audience behavior data, and criteria defined by the advertising campaign, the criteria including a target audience group;
   tentatively scheduling the selected advertising campaign to the surface location; and
   determining how much of the estimated available inventory would remain for the second time period.

2. The method of claim 1, wherein the page is associated with a category, and wherein the method further comprises associating the campaign with the web page and the category during the second time period.

3. The method of claim 2, wherein: associating the campaign with the category during the second time period comprises selecting the category based on the target audience group defined by the campaign.

4. The method of claim 2, wherein the surface location is a node on a management hierarchy, the method further comprising:
   maintaining the management hierarchy, wherein each node in the management hierarchy is assigned a corresponding category, and wherein categories of lower level nodes of the management hierarchy sub-divide the categories of one or more higher level nodes, and wherein associating the campaign with the category during the second time period further comprises associating the campaign with one or more nodes of the management hierarchy.

5. The method of claim 1, further comprising:
associating the campaign with the web page specifying a total amount of inventory to be consumed by the campaign; and
allocating to the web page, collectively, a portion of the total amount of inventory to be consumed by the campaign, wherein the portion is proportional to the estimated available inventory.

6. The method of claim 1, further comprising presenting the estimated available inventory for the web page during the second time period.

7. A non-transitory computer-readable medium storing executable instructions that, when executed by a computer system including at least one processor communicatively coupled to a database, cause the computer system to perform operations including:
receiving, from a media client application executed on a plurality of client devices, via packet-switched network, a plurality of status messages in response to dynamic programming content presented at a user-selected surface location on a web page via the media client application, each status message including (i) a unique identifier associated with a corresponding client device and (ii) a time stamp indicating a time at which the content is presented;
determining, for each of the plurality of client devices, a cumulative amount of dynamic programming content presented at the user-selected surface location over a first time period based on the plurality of status messages;
tracking audience behavior data associated with the presented dynamic programming content based on the plurality of status messages, each status message indicating whether the presented content is being at least one of fast forwarded, paused, played, and skipped;
estimating a cumulative amount of time that dynamic programming content will be presented at the surface location on the web page during a second time period by applying a time series algorithm to data associated with the determined cumulative amount of time that dynamic programming content was presented at the surface location during the first time period, the second time period including a future date and a corresponding time block;
estimating an available inventory at the surface location by:
calculating, for the surface location, a product of (i) a desired spot load for the second time period and (ii) the estimated cumulative amount of time that the dynamic programming content will be presented at the surface location on the web page during the second time period, wherein the desired spot load is a number of creative content items to be presented per length of time a dynamic programming content is to be presented during the second time period;
selecting an advertising campaign for the surface location during the second time period based on the estimated available inventory, the tracked audience behavior data, and criteria defined by the campaign, the criteria including a target audience group;
tentatively scheduling the selected advertising campaign to the surface location; and
determining how much of the estimated available inventory would remain for the second time period.

8. The medium of claim 7, wherein the web page is associated with a category, and wherein the instructions, when executed, further cause the computer system to perform operations including associating the campaign with the web page and the category during the second time period.

9. The medium of claim 8, wherein
associating the campaign with the category during the second time period comprises selecting the category based on the target audience group defined by the campaign.

10. The medium of claim 8, wherein the surface location is a node on a management hierarchy, and wherein the instructions, when executed, further cause the computer system to perform operations including:
maintaining the management hierarchy, wherein each node in the management hierarchy is assigned a corresponding category, and wherein categories of lower level nodes of the management hierarchy sub-divide the categories of one or more higher level nodes, and wherein associating the campaign with the category during the second time period further comprises associating the web page with one or more nodes of the management hierarchy.

11. The medium of claim 7, wherein the instructions, when executed, further cause the computer system to perform operations including:
associating the campaign with the web page specifying a total amount of inventory to be consumed by the campaign; and
allocating to the web page, collectively, a portion of the total amount of inventory to be consumed by the campaign, wherein the portion is proportional to the estimated available inventory.

12. The medium of claim 7, wherein the instructions, when executed, further cause the computer system to perform operations including presenting the estimated available inventory for the web page during the second time period.

13. A system comprising:
at least one processor communicatively coupled to a database, the at least one processor configured to:
receive, via a packet-switched network, from a media client application executed on a plurality of client devices, a plurality of status messages in response to dynamic programming content presented at a user-selected surface location on a web page via the media client application, each status message including (i) a unique identifier associated with a corresponding client device and (ii) a time stamp indicating a time at which the content is presented;
determine, for each of the plurality of client devices, a cumulative amount of dynamic programming content presented at the user-selected surface location over a first time period based on the plurality of status messages;
track audience behavior data associated with the presented dynamic programming content based on the plurality of status messages, each status message indicating whether the presented dynamic programming content is being at least one of fast forwarded, paused, played, and skipped;
estimate a cumulative amount of time that dynamic programming content will be presented at the surface location on the web page during a second time period by applying a time series algorithm to data associated with the determined cumulative amount of time that dynamic programming content was presented at the surface location during the first time period, the second time period including a future date and a corresponding time block;

estimate an available inventory at the surface location by:

calculating, for the surface location, a product of (i) a desired spot load for the second time period and (ii) the estimated cumulative amount of time that the dynamic programming content will be presented at the surface location on the web page during the second time period, wherein the desired spot load is a number of creative content items to be presented per length of time a dynamic programming content is to be presented during the second time period;

select an advertising campaign for the surface location during the second time period based on the estimated available inventory, the tracked audience behavior data, and criteria defined by the advertising campaign, the criteria including a target audience group;

tentatively schedule the selected advertising campaign to the surface location; and determine how much of the estimated available inventory would remain for the second time period.

14. The system of claim 13, wherein the web page is associated with a category, and wherein the at least one processor is further configured to associate the campaign with the web page and the category during the second time period.

15. The system of claim 14, wherein the at least one processor is configured to associate the campaign with the category during the second time period by selecting the category based on the target audience group defined by the campaign.

16. The system of claim 14, wherein the surface location is a node on a management hierarchy, and wherein the at least one processor is further configured to:

maintain the management hierarchy, wherein each node in the management hierarchy is assigned a corresponding category, and wherein categories of lower level nodes of the management hierarchy sub-divide the categories of one or more higher level nodes, and wherein the at least one processor is further configured to associate the campaign with the category during the second time period by associating the campaign with one or more nodes of the management hierarchy.

17. The system of claim 13, wherein the at least one processor is further configured to:

associate the campaign with the web page specifying a total amount of inventory to be consumed by the campaign; and allocate to the web page, collectively, a portion of the total amount of inventory to be consumed by the campaign, wherein the portion is proportional to the estimated available inventory.

18. The system of claim 13, wherein the at least one processor is further configured to present the estimated available inventory for the web page during the second time period.

* * * * *

UNITED STATES PATENT AND TRADEMARK OFFICE
CERTIFICATE OF CORRECTION

PATENT NO. : 11,132,705 B1  
APPLICATION NO. : 11/088263  
DATED : September 28, 2021  
INVENTOR(S) : Des Jardins et al.

Page 1 of 1

It is certified that error appears in the above-identified patent and that said Letters Patent is hereby corrected as shown below:

In the Claims

Claim 2, Column 28, Line 55, delete "the" and insert --the web--.

Claim 3, Column 28, Line 59, delete "wherein:" and insert --wherein--.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*